(12) United States Patent
Watarai et al.

(10) Patent No.: US 9,540,070 B2
(45) Date of Patent: Jan. 10, 2017

(54) BICYCLE SPROCKET AND BICYCLE CRANK ASSEMBLY

(71) Applicant: SHIMANO INC., Sakai (JP)

(72) Inventors: Etsuyoshi Watarai, Sakai (JP); Kenji Kamada, Sakai (JP)

(73) Assignee: SHIMANO INC., Sakai (JP)

(*) Notice: Subject to any disclaimer, the term of this patent is extended or adjusted under 35 U.S.C. 154(b) by 0 days.

(21) Appl. No.: 14/723,405

(22) Filed: May 27, 2015

(65) Prior Publication Data

US 2016/0347409 A1 Dec. 1, 2016

(51) Int. Cl.
| F16H 55/30 | (2006.01) |
| F16H 7/06 | (2006.01) |
| B62M 9/02 | (2006.01) |
| B62M 9/00 | (2006.01) |

(52) U.S. Cl.
CPC ............... *B62M 9/02* (2013.01); *B62M 9/00* (2013.01); *F16H 55/30* (2013.01); *B62M 2009/007* (2013.01)

(58) Field of Classification Search
CPC ............. F16H 55/30; F16H 7/06; B62M 9/10; B62M 9/105; Y10T 74/2165
USPC .................................................. 474/152, 156
See application file for complete search history.

(56) References Cited

U.S. PATENT DOCUMENTS

| 586,991 | A | * | 7/1897 | Curley | .................... | F16H 55/30 |
| | | | | | | 474/156 |
| 590,649 | A | * | 9/1897 | Ribyn, Jr. | ............... | F16H 55/30 |
| | | | | | | 474/156 |
| 591,270 | A | * | 10/1897 | Gauthier | ................. | F16H 55/30 |
| | | | | | | 474/156 |
| 1,482,896 | A | * | 2/1924 | Huntington | ............. | F16H 55/30 |
| | | | | | | 301/6.5 |
| 2,602,343 | A | * | 7/1952 | Barrett | ................... | B62D 55/08 |
| | | | | | | 299/83.1 |
| 3,498,148 | A | * | 3/1970 | Palermo | .................... | F16H 7/00 |
| | | | | | | 474/154 |

(Continued)

OTHER PUBLICATIONS

Levy, "MRP's New Wave Ring, Carbon Guide and Slope Fork-Eurobike 2014", MTBR & RoadBileReview, [online]. Aug. 28, 2014 Retrieved from the Internet:< URL: http://www.pinkbike.com/news/mrp-wave-ring-carbon-guide-and-slope-fork-eurobike-2014.html>.

(Continued)

*Primary Examiner* — Henry Liu
(74) *Attorney, Agent, or Firm* — Mori & Ward, LLP

(57) ABSTRACT

A bicycle sprocket comprises a sprocket body and a chain engagement structure. The sprocket body has a rotational center axis, a first side and a second side opposite to the first side in an axial direction parallel to the rotational center axis. The chain engagement structure includes a plurality of sprocket teeth. The plurality of sprocket teeth include a plurality of first teeth and a plurality of second teeth. The plurality of first teeth each include an outer-link supporting surface, an opposite surface, and a first radially outermost tooth-tip. The opposite surface is spaced part from the second outer link plate in a state where the chain engagement structure engages with the bicycle chain. The plurality of second teeth each include a second radially outermost tooth-tip that is offset from the first radially outermost tooth-tip of each of the plurality of first teeth in the axial direction.

23 Claims, 19 Drawing Sheets

(56) References Cited

U.S. PATENT DOCUMENTS

| | | | | | |
|---|---|---|---|---|---|
| 3,956,943 | A * | 5/1976 | Yamasaki | ............... | F16H 55/30 |
| | | | | | 474/148 |
| 4,174,642 | A * | 11/1979 | Martin | .................... | F16H 55/30 |
| | | | | | 474/152 |
| 4,259,880 | A * | 4/1981 | Ueno | ..................... | B62M 9/105 |
| | | | | | 474/160 |
| 4,268,259 | A * | 5/1981 | Segawa | .................. | F16H 55/30 |
| | | | | | 474/160 |
| 4,330,286 | A * | 5/1982 | Nagano | .................. | F16H 55/30 |
| | | | | | 474/152 |
| 4,384,865 | A * | 5/1983 | Ueno | ...................... | B62M 9/10 |
| | | | | | 474/160 |
| 5,066,264 | A * | 11/1991 | Romano | ................. | B62M 9/10 |
| | | | | | 474/152 |
| 5,192,249 | A * | 3/1993 | Nagano | .................... | B62M 9/10 |
| | | | | | 474/160 |
| 5,738,603 | A * | 4/1998 | Schmidt | .................. | B62M 9/10 |
| | | | | | 474/158 |
| 5,935,033 | A * | 8/1999 | Tseng | .................... | B62M 9/105 |
| | | | | | 474/116 |
| 6,013,001 | A * | 1/2000 | Miyoshi | .................. | B62M 9/10 |
| | | | | | 474/156 |
| 7,416,500 | B2 * | 8/2008 | Young | ....................... | F16H 7/06 |
| | | | | | 474/152 |
| 8,888,631 | B2 * | 11/2014 | Morita | ...................... | F16H 7/06 |
| | | | | | 474/153 |
| 9,062,758 | B2 * | 6/2015 | Reiter | ................... | F16H 55/303 |
| 9,086,138 | B1 * | 7/2015 | Emura | ................... | B62M 9/105 |
| 9,150,277 | B2 * | 10/2015 | Emura | ..................... | B62M 3/00 |
| 9,182,027 | B2 * | 11/2015 | Reiter | .................... | B62M 9/105 |
| 9,291,250 | B2 * | 3/2016 | Reiter | .................... | B62M 9/105 |
| 9,316,302 | B2 * | 4/2016 | Braedt | ................... | B62M 9/126 |
| 9,328,814 | B2 * | 5/2016 | Wesling | ................. | F16H 55/06 |
| 2007/0054768 | A1 * | 3/2007 | Miyazawa | .............. | F16H 55/30 |
| | | | | | 474/152 |
| 2007/0060428 | A1 * | 3/2007 | Meggiolan | ............... | B62M 9/10 |
| | | | | | 474/160 |
| 2011/0092327 | A1 * | 4/2011 | Oishi | ....................... | B62M 9/10 |
| | | | | | 474/160 |
| 2012/0172165 | A1 * | 7/2012 | Schroedl | .................. | B62M 9/02 |
| | | | | | 474/160 |
| 2013/0139642 | A1 * | 6/2013 | Reiter | .................... | B62M 9/105 |
| | | | | | 74/594.2 |
| 2015/0094179 | A1 * | 4/2015 | Iwai | ......................... | F16H 55/30 |
| | | | | | 474/152 |
| 2015/0362057 | A1 * | 12/2015 | Wesling | .................. | F16H 55/06 |
| | | | | | 474/152 |

OTHER PUBLICATIONS

Sumner, "Sea Otter MRP shows new AMG chainguide, Wave chainring", MTBR & RoadBileReview, [online]. Apr. 23, 2015 Retrieved from the Internet: < URL: http://reviews.mtbr.com/sea-otter-mrp-shows-new-amg-chainguide-wave-chainring>.

* cited by examiner

BICYCLE SPROCKET AND BICYCLE CRANK ASSEMBLY

BACKGROUND OF THE INVENTION

Field of the Invention

The present invention relates to a bicycle sprocket and a bicycle crank assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket.

SUMMARY OF THE INVENTION

In accordance with a first aspect of the present invention, a bicycle sprocket comprises a sprocket body and a chain engagement structure. The sprocket body has a rotational center axis, a first side and a second side opposite to the first side in an axial direction parallel to the rotational center axis. The chain engagement structure is disposed on an outer periphery of the sprocket body. The chain engagement structure includes a plurality of sprocket teeth extending radially outward from the outer periphery of the sprocket body. The plurality of sprocket teeth include a plurality of first teeth and a plurality of second teeth. The plurality of first teeth are configured to engage with an opposed pair of a first outer link plate and a second outer link plate of a bicycle chain. The plurality of second teeth are configured to engage with an opposed pair of a first inner link plate and a second inner link plate of the bicycle chain. The plurality of first teeth each include an outer-link supporting surface, an opposite surface and a first radially outermost tooth-tip positioned between the outer-link supporting surface and the opposite surface in the axial direction. The outer-link supporting surface is closer to the first side than to the second side in the axial direction and is configured to support the first outer link plate at the first side. The opposite surface is opposite to the outer-link supporting surface in the axial direction. The opposite surface is spaced part from the second outer link plate in a state where the chain engagement structure engages with the bicycle chain. The plurality of second teeth each include a second radially outermost tooth-tip that is offset from the first radially outermost tooth-tip of each of the plurality of first teeth in the axial direction. At least one of the plurality of second teeth is disposed between two of the plurality of first teeth so that the at least one of the plurality of second teeth is adjacent to each of the two of the plurality of first teeth without another tooth between the at least one of the plurality of second teeth and each of the two of the plurality of first teeth.

With the bicycle sprocket in accordance with the first aspect, it is possible to improve the function to hold the bicycle chain in the bicycle sprocket with reducing a frictional resistance between the plurality of first teeth and the bicycle chain.

In accordance with a second aspect of the present invention, the bicycle sprocket according to the first aspect is configured so that the plurality of first teeth are each positioned to be closer to the first side than the plurality of second teeth.

With the bicycle sprocket in accordance with the second aspect, it is possible to effectively improve the function to hold the bicycle chain in the bicycle sprocket with keeping a simple structure of the bicycle sprocket.

In accordance with a third aspect of the present invention, the bicycle sprocket according to the first or second aspect is configured so that the plurality of first teeth has a first axial chain-engagement width. The plurality of second teeth has a second axial chain-engagement width that is equal to or larger than the first axial chain-engagement width.

With the bicycle sprocket in accordance with the third aspect, it is possible to improve the function to hold the bicycle chain in the bicycle sprocket with keeping the desired strength of the second teeth.

In accordance with a fourth aspect of the present invention, the bicycle sprocket according to any one of the first to third aspects is configured so that a total number of the plurality of sprocket teeth is an even number.

With the bicycle sprocket in accordance with the fourth aspect, it is possible to effectively improve the function to hold the bicycle chain in the bicycle sprocket because, during pedaling, the plurality of first teeth can always engage with an opposed pair of the first outer link plate and the second outer link plate of the bicycle chain and the plurality of second teeth can always engage with the opposed pair of the first inner link plate and the second inner link plate of the bicycle chain.

In accordance with a fifth aspect of the present invention, the bicycle sprocket according to the fourth aspect is configured so that a total number of the plurality of first teeth is equal to a total number of the plurality of second teeth.

With the bicycle sprocket in accordance with the fifth aspect, it is possible to effectively improve the function to hold the bicycle chain in the bicycle sprocket because, during pedaling, the plurality of first teeth can always engage with an opposed pair of the first outer link plate and the second outer link plate of the bicycle chain and the plurality of second teeth can always engage with the opposed pair of the first inner link plate and the second inner link plate of the bicycle chain.

In accordance with a sixth aspect of the present invention, the bicycle sprocket according to any one of the first to fifth aspects is configured so that the plurality of second teeth are arranged alternatingly between the plurality of first teeth.

With the bicycle sprocket in accordance with the sixth aspect, it is possible to effectively improve the function to hold the bicycle chain in the bicycle sprocket because, during pedaling, the plurality of first teeth can always engage with an opposed pair of the first outer link plate and the second outer link plate of the bicycle chain and the plurality of second teeth can always engage with the opposed pair of the first inner link plate and the second inner link plate of the bicycle chain.

In accordance with a seventh aspect of the present invention, the bicycle sprocket according to any one of the first to sixth aspects is configured so that the plurality of sprocket teeth includes at least one third tooth configured to engage with a pair of outer link plates of a bicycle chain, the at least one third tooth having a chain-engagement width that is larger than an inner link space defined between a pair of inner link plates of the bicycle chain and smaller than an outer link space defined between a pair of outer link plates of the bicycle chain.

With the bicycle sprocket in accordance with the seventh aspect, it is possible to prevent the bicycle chain from being engaged with the bicycle sprocket in a wrong arrangement.

In accordance with an eighth aspect of the present invention, the bicycle sprocket according to the seventh aspect is configured so that a total number of the plurality of first teeth is less than a total number of the plurality of second teeth.

With the bicycle sprocket in accordance with the eighth aspect, it is possible to prevent the bicycle chain from being engaged with the bicycle sprocket in a wrong arrangement.

In accordance with a ninth aspect of the present invention, the bicycle sprocket according to any one of the first to eighth aspects is configured so that at least one of the plurality of first teeth has an indicator to indicate that the at least one of the plurality of first teeth engages with outer link plates of the bicycle chain.

With the bicycle sprocket in accordance with the ninth aspect, it is possible to prevent the bicycle chain from being engaged with the bicycle sprocket in a wrong arrangement.

In accordance with a tenth aspect of the present invention, the bicycle sprocket according to any one of the first to ninth aspects is configured so that the plurality of first teeth are offset from the plurality of second teeth toward the first side in the axial direction.

With the bicycle sprocket in accordance with the tenth aspect, it is possible to effectively improve the function to hold the bicycle chain in the bicycle sprocket.

In accordance with an eleventh aspect of the present invention, the bicycle sprocket according to any one of the first to tenth aspects is configured so that at least one of the plurality of first teeth has a recess to avoid an excessive contact of the at least one of the plurality of first teeth with an inner link plate of the bicycle chain.

With the bicycle sprocket in accordance with the eleventh aspect, it is possible to reduce a frictional resistance between the at least one of the plurality of first teeth and the inner link plate of the bicycle chain.

In accordance with a twelfth aspect of the present invention, the bicycle sprocket according to any one of the first to eleventh aspects is configured so that the plurality of first teeth each have a recess to avoid an excessive contact of the plurality of first teeth with an inner link plate of the bicycle chain.

With the bicycle sprocket in accordance with the twelfth aspect, it is possible to reduce a frictional resistance between the plurality of first teeth and the inner link plate of the bicycle chain.

In accordance with a thirteenth aspect of the present invention, the bicycle sprocket according to any one of the first to twelfth aspects is configured so that the outer-link supporting surface is formed by bending the plurality of first teeth.

With the bicycle sprocket in accordance with the thirteenth aspect, it is possible to effectively improve the function to hold the bicycle chain in the bicycle sprocket with keeping a simple structure of the bicycle sprocket.

In accordance with a fourteenth aspect of the present invention, the bicycle sprocket according to any one of the first to thirteenth aspects is configured so that the first side is closer to a bicycle frame than the second side in the axial direction in a state where the bicycle sprocket is mounted to the bicycle frame.

With the bicycle sprocket in accordance with the fourteenth aspect, it is possible to effectively improve the function to hold the bicycle chain in the bicycle sprocket.

In accordance with a fifteenth aspect of the present invention, the bicycle sprocket according to any one of the first to fourteenth aspects is configured so that the second side is closer to a bicycle frame than the first side in the axial direction in a state where the bicycle sprocket is mounted to the bicycle frame. With the bicycle sprocket in accordance with the fifteenth aspect, it is possible to effectively improve the function to hold the bicycle chain in the bicycle sprocket.

In accordance with a sixteenth aspect of the present invention, the bicycle sprocket according to any one of the first to fifteenth aspects further comprises a crank arm attachment portion.

With the bicycle sprocket in accordance with the sixteenth aspect, it is possible to effectively improve the function to hold the bicycle chain in a front bicycle sprocket.

In accordance with a seventeenth aspect of the present invention, a bicycle crank assembly comprises the bicycle sprocket according to any one of the first to sixteenth aspects.

With the bicycle crank assembly in accordance with the seventeenth aspect, it is possible to effectively improve the function to hold the bicycle chain in a bicycle crank assembly.

In accordance with an eighteenth aspect of the present invention, the bicycle crank assembly according to the seventeenth aspect is configured so that the bicycle sprocket is a single sprocket for the bicycle crank assembly.

With the bicycle crank assembly in accordance with the eighteenth aspect, it is possible to effectively improve the function to hold the bicycle chain in a single front sprocket.

In accordance with a nineteenth aspect of the present invention, the bicycle sprocket according to any one of the first to eighteenth aspects is configured so that the plurality of second teeth each include a first inner-link supporting surface and a second inner-link supporting surface. The first inner-link supporting surface is closer to the first side than to the second side in the axial direction and is configured to support the first inner link plate. The second inner-link supporting surface is closer to the second side than to the first side in the axial direction and is configured to support the second inner link plate. The second inner-link supporting surface is opposite to the first inner-link supporting surface in the axial direction. The second radially outermost tooth-tip is positioned between the first inner-link supporting surface and the second inner-link supporting surface in the axial direction. A maximum axial distance between the second radially outermost tooth-tip and the first inner-link supporting surface is shorter than a maximum axial distance between the second radially outermost tooth-tip and the second inner-link supporting surface in the axial direction.

With the bicycle sprocket in accordance with the nineteenth aspect, it is possible to effectively improve the function to hold the bicycle chain in the bicycle sprocket.

In accordance with a twentieth aspect of the present invention, the bicycle sprocket according to any one of the first to nineteenth aspects is configured so that the plurality of second teeth each include a first inner-link supporting surface and a second inner-link supporting surface. The first inner-link supporting surface is closer to the first side than to the second side in the axial direction and is configured to support the first inner link plate. The second inner-link supporting surface is closer to the second side than to the first side in the axial direction and is configured to support the first inner link plate. The second inner-link supporting surface is opposite to the first inner-link supporting surface in the axial direction. The opposite surface of the plurality of first teeth is closer to the first side than the second inner-link supporting surface in the axial direction.

With the bicycle sprocket in accordance with the twentieth aspect, it is possible to effectively improve the function to hold the bicycle chain in the bicycle sprocket.

In accordance with a twenty-first aspect of the present invention, a bicycle sprocket comprises a sprocket body and a chain engagement structure. The sprocket body has a rotational center axis, a first side and a second side opposite to the first side in an axial direction parallel to the rotational center axis. The chain engagement structure is disposed on an outer periphery of the sprocket body. The chain engagement structure includes a plurality of sprocket teeth extending radially outward from the outer periphery of the sprocket body. The plurality of sprocket teeth include a plurality of first teeth and a plurality of second teeth. The plurality of first teeth are configured to engage with an opposed pair of a first outer link plate and a second outer link plate of a bicycle chain. The plurality of second teeth are configured to engage with an opposed pair of a first inner link plate and a second inner link plate of the bicycle chain. The plurality of first teeth each include a first radially outermost tooth-tip and an outer-link supporting surface closer to the first side than to the second side in the axial direction. The outer-link supporting surface is configured to support the first outer link plate at the first side. The plurality of first teeth each are free from another outer-link supporting surface opposite to the outer-link supporting surface in the axial direction. The plurality of second teeth each include a second radially outermost tooth-tip that is offset from the first radially outermost tooth-tip of each of the plurality of first teeth in the axial direction. At least one of the plurality of second teeth is disposed between two of the plurality of first teeth so that the at least one of the plurality of second teeth is adjacent to each of the two of the plurality of first teeth without another tooth between the at least one of the plurality of second teeth and each of the two of the plurality of first teeth.

With the bicycle sprocket in accordance with the twenty-first aspect, it is possible to improve the function to hold the bicycle chain in the bicycle sprocket with reducing a frictional resistance between the plurality of first teeth and the bicycle chain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
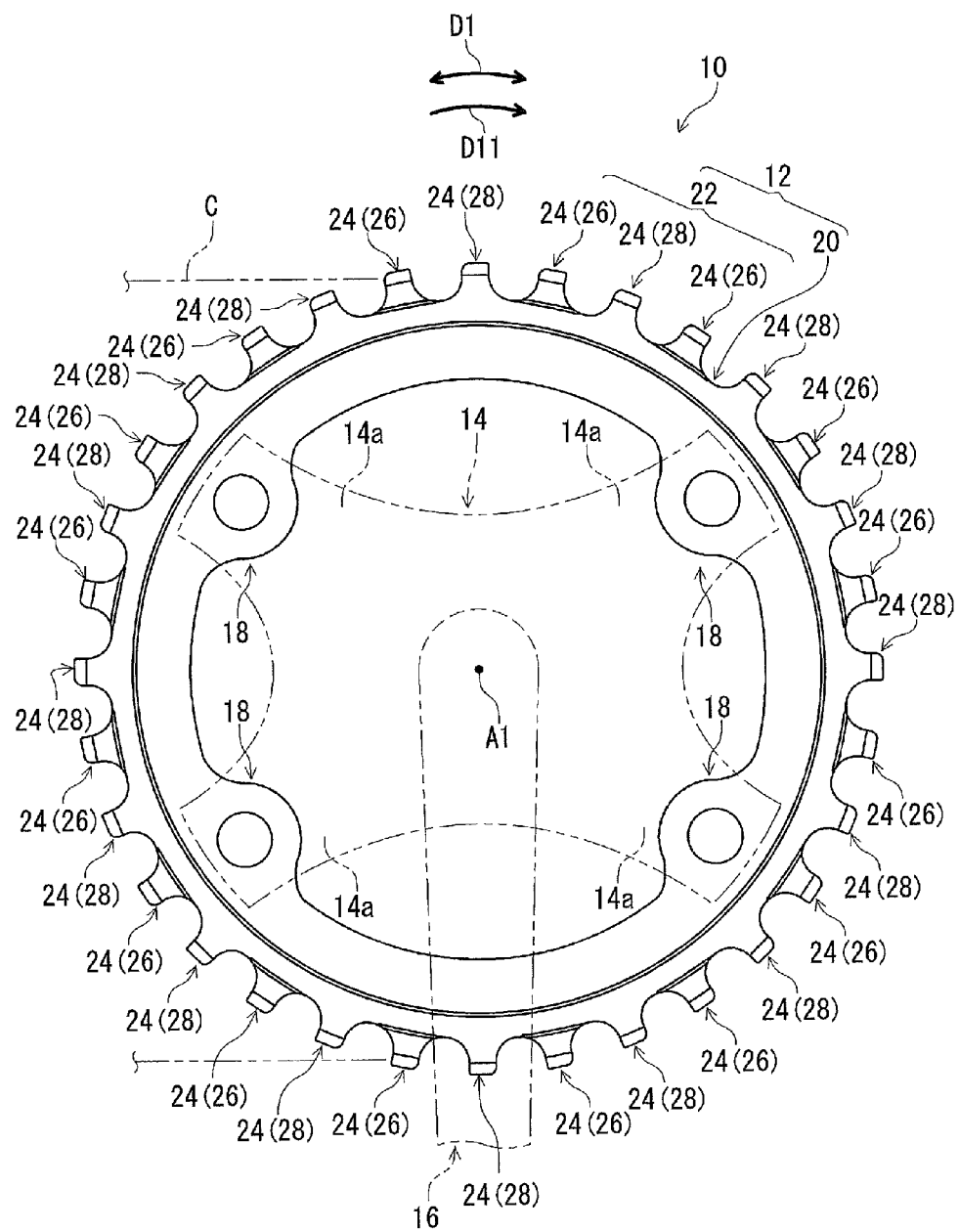
FIG. 1 is a front elevational view of a bicycle crank assembly including a bicycle sprocket in accordance with a first embodiment.

The embodiments will now be described with reference to the accompanying drawings, wherein like reference numerals designate corresponding or identical elements throughout the various drawings.

First Embodiment

Figure 3:
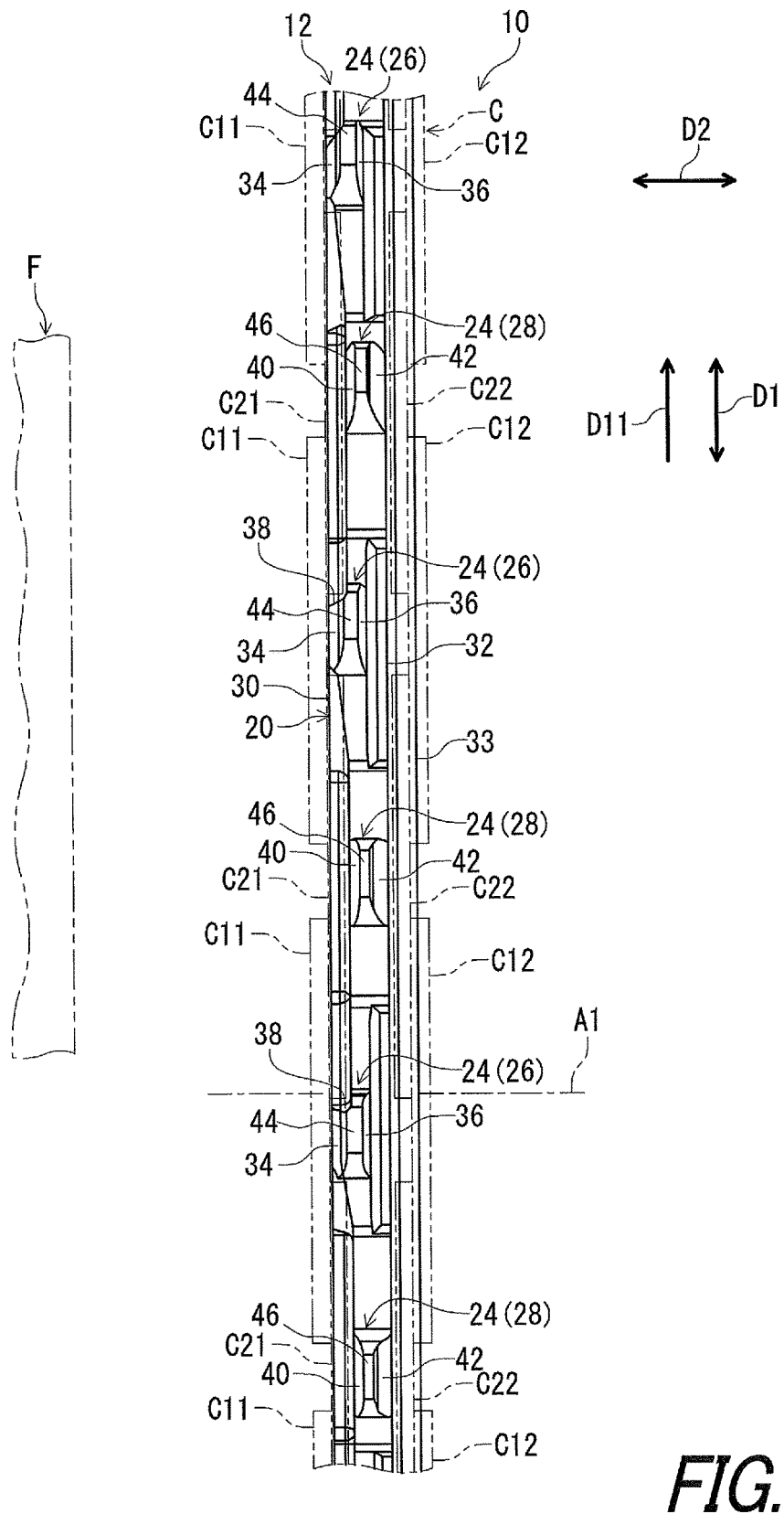
FIG. 3 is a partial plan view of the bicycle sprocket illustrated in FIG. 1 when viewed from a radial direction of the bicycle sprocket.

Referring initially to FIG. 1, a bicycle crank assembly 10 comprises a bicycle sprocket 12 in accordance with a first embodiment. The bicycle sprocket 12 is rotatable about a rotational center axis A1 relative to a bicycle frame F (FIG. 3). In the illustrated embodiment, the bicycle sprocket 12 is a single sprocket for the bicycle crank assembly 10. However, the bicycle crank assembly 10 can include a plurality of bicycle sprockets if needed and/or desired. In such an embodiment, at least one of the bicycle sprockets can have substantially the same construction as the bicycle sprocket 12. While the bicycle sprocket 12 is applied to the bicycle crank assembly 10 in the illustrated embodiment, structures of the bicycle sprocket 12 can be applied to a bicycle rear sprocket assembly if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket 12 of the bicycle crank assembly 10, should be interpreted relative to the bicycle equipped with the bicycle sprocket 12 as used in an upright riding position on a horizontal surface.

As seen in FIG. 1, the bicycle crank assembly 10 includes a sprocket mounting member 14 and a crank arm 16. The sprocket mounting member 14 includes crank connecting arms 14a. The bicycle sprocket 12 comprises a crank arm attachment portion. In the illustrated embodiment, the bicycle sprocket 12 further comprises crank arm attachment portions 18. The crank connecting arms 14a are respectively fastened to the crank arm attachment portions 18 by fasteners such as bolts (not shown). The sprocket mounting member 14 is mounted on the crank arm 16 to be rotatable integrally with the crank arm 16 about the rotational center axis A1. The sprocket mounting member 14 can also be integrally provided with the crank arm 16 as a single unitary member. Namely, the bicycle sprocket 12 is configured to be rotatable integrally with the sprocket mounting member 14 and the crank arm 16 about the rotational center axis A1. The bicycle sprocket 12 is configured to be rotated about the rotational center axis A1 in a driving-rotational direction D11 during the pedaling. The driving-rotational direction D11 is defined along a circumferential direction D1 of the bicycle sprocket 12.

Figure 2:
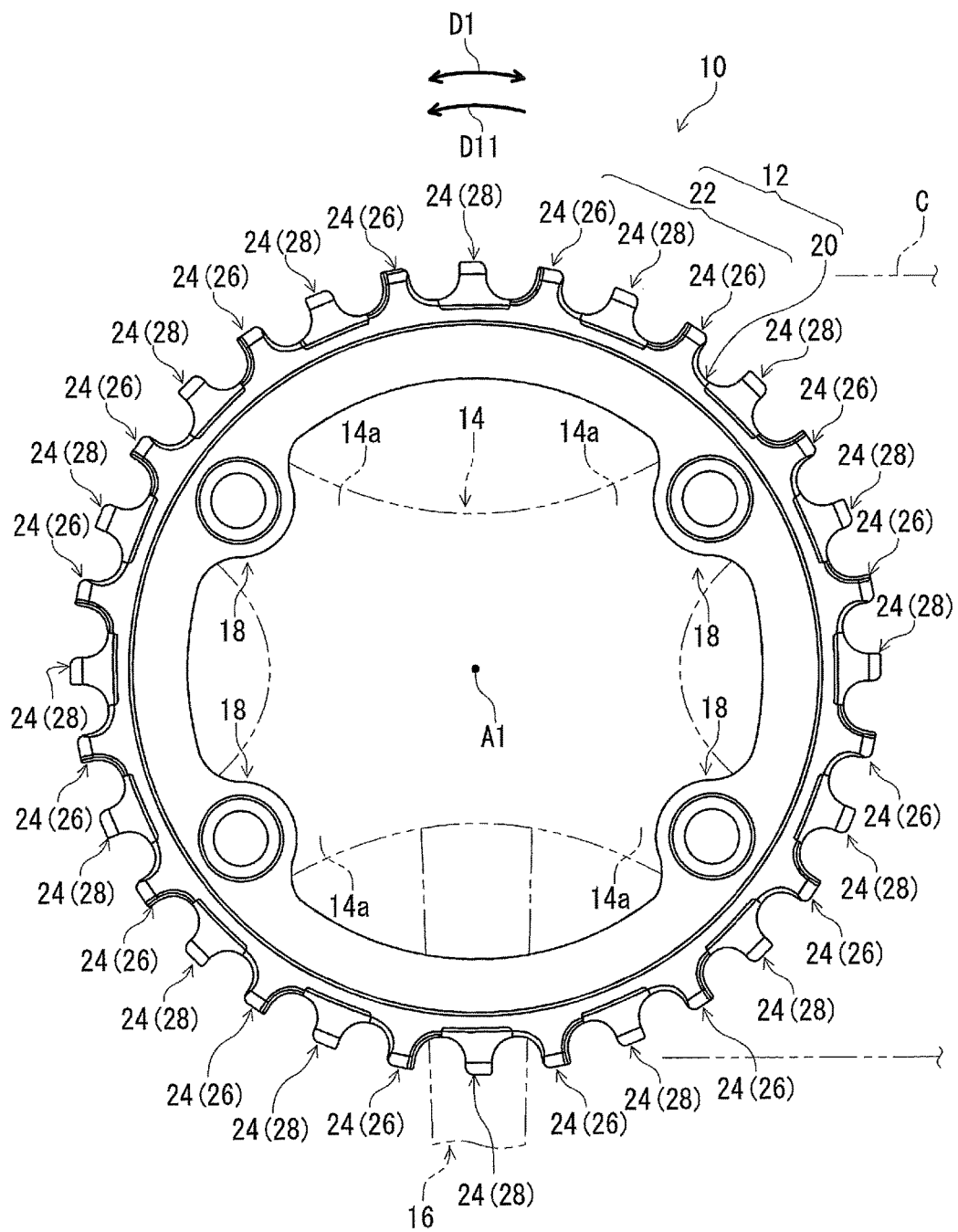
FIG. 2 is a rear elevational view of the bicycle crank assembly illustrated in FIG. 1.

As seen in FIGS. 1 and 2, the bicycle sprocket 12 comprises a sprocket body 20 and a chain engagement structure 22. The sprocket body 20 has the rotational center axis A1. While the sprocket body 20 has an annular shape in the illustrated embodiment, the sprocket body 20 can have other shapes if needed and/or desired. The chain engagement structure 22 is disposed on an outer periphery of the sprocket body 20. The chain engagement structure 22 includes a plurality of sprocket teeth 24 extending radially outward from the outer periphery of the sprocket body 20. The plurality of sprocket teeth 24 are configured to engage with a bicycle chain C.

The plurality of sprocket teeth 24 including a plurality of first teeth 26 and a plurality of second teeth 28. At least one of the plurality of second teeth 28 is disposed between two of the plurality of first teeth 26 so that the at least one of the plurality of second teeth 28 is adjacent to each of the two of the plurality of first teeth 26 without another tooth between the at least one of the plurality of second teeth 28 and each of the two of the plurality of first teeth 26.

In the illustrated embodiment, each of the plurality of second teeth 28 is disposed between two of the plurality of first teeth 26 so that the second tooth 28 is adjacent to each of the two of the plurality of first teeth 26 without another tooth between the second tooth 28 and each of the two of the plurality of first teeth 26. Namely, the plurality of second teeth 28 are arranged alternatingly between the plurality of first teeth 26.

As seen in FIG. 1, a total number of the plurality of sprocket teeth 24 is an even number. A total number of the plurality of first teeth 26 is equal to a total number of the plurality of second teeth 28. In the illustrated embodiment, the plurality of sprocket teeth 24 include sixteen first teeth 26 and sixteen second teeth 28. However, the total number of the plurality of sprocket teeth 24, the total number of the plurality of first teeth 26, and the total number of the plurality of second teeth 28 are not limited to the illustrated embodiment. The total number of the plurality of sprocket teeth 24 can be an uneven number if needed and/or desired. The total number of the plurality of first teeth 26 can be different from a total number of the plurality of second teeth 28 if needed and/or desired.

Furthermore, the plurality of sprocket teeth 24 can partly be omitted from the bicycle sprocket 12 if needed and/or desired. The plurality of sprocket teeth 24 can include one first tooth 26 if needed and/or desired. The plurality of sprocket teeth 24 can include one second tooth 28 if needed and/or desired. The first teeth 26 can partly be replaced with the second tooth 28 if needed and/or desired. The second teeth 28 can partly be replaced with the first tooth 26 if needed and/or desired. The bicycle sprocket 12 can include at least one tooth having a shape different from a shape of the first teeth 26 and from a shape of the second teeth 28 if needed and/or desired.

As seen in FIG. 3, the sprocket body 20 has a first side 30 and a second side 32. The second side 32 is opposite to the first side 30 in an axial direction D2 parallel to the rotational center axis A1. In the illustrated embodiment, the first side 30 is closer to the bicycle frame F than the second side 32 in the axial direction D2 in a state where the bicycle sprocket 12 is mounted to the bicycle frame F.

Figure 4:
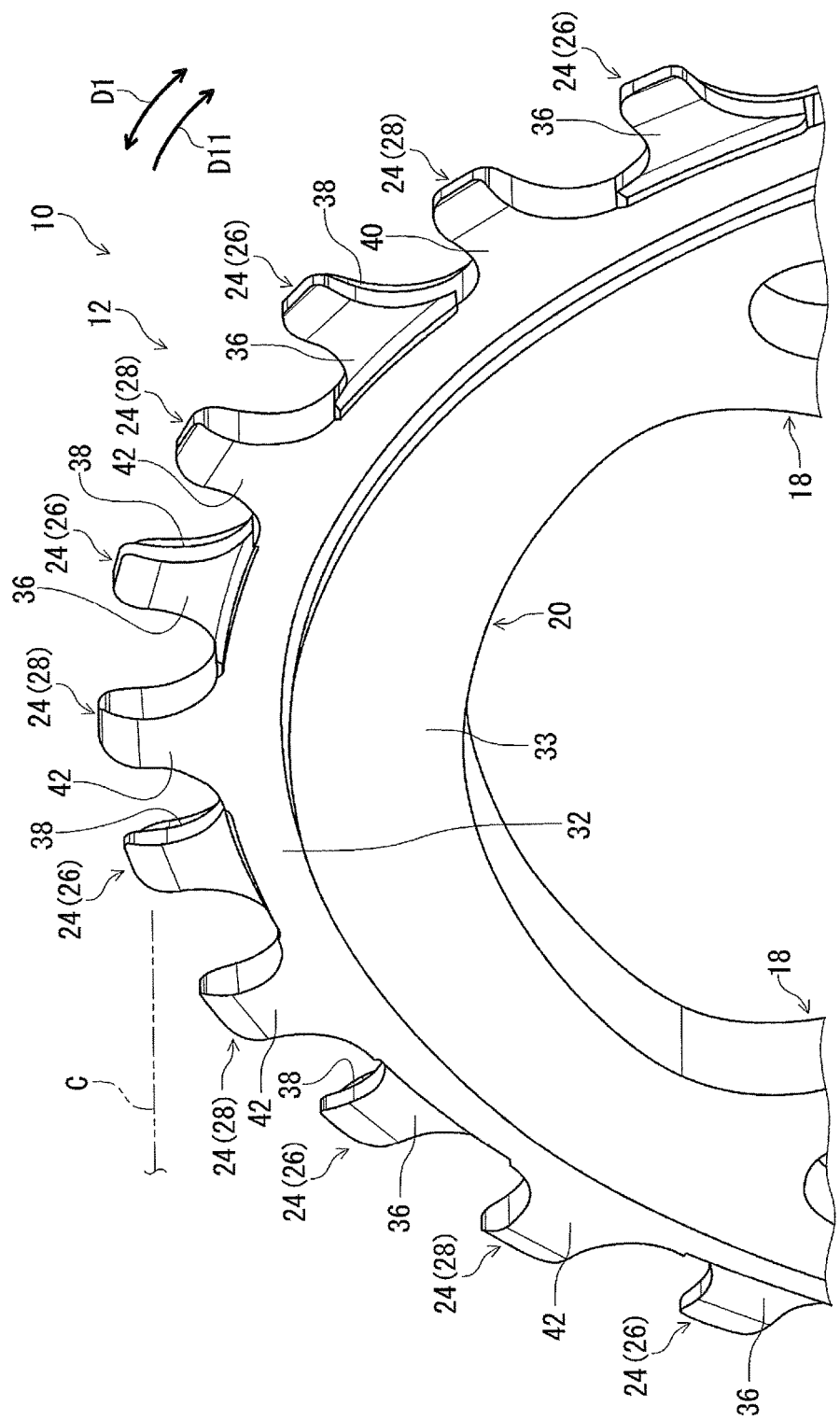
FIG. 4 is a perspective view of the bicycle sprocket illustrated in FIG. 1.

As seen in FIG. 4, the sprocket body 20 includes an annular part 33 provided on the second side 32. The annular part 33 increases a maximum axial width of the sprocket body 20 to improve the strength of the sprocket body 20. However, the annular part 33 can be omitted from the sprocket body 20 if needed and/or desired.

As seen in FIG. 3, the plurality of first teeth 26 are configured to engage with an opposed pair of a first outer link plate C11 and a second outer link plate C12 of the bicycle chain C. The plurality of second teeth 28 are configured to engage with an opposed pair of a first inner link plate C21 and a second inner link plate C22 of the bicycle chain C. The plurality of first teeth 26 are each positioned to be closer to the first side 30 than the plurality of second teeth 28. The plurality of first teeth 26 are offset from the plurality of second teeth 28 toward the first side 30 in the axial direction D2.

Figure 5:
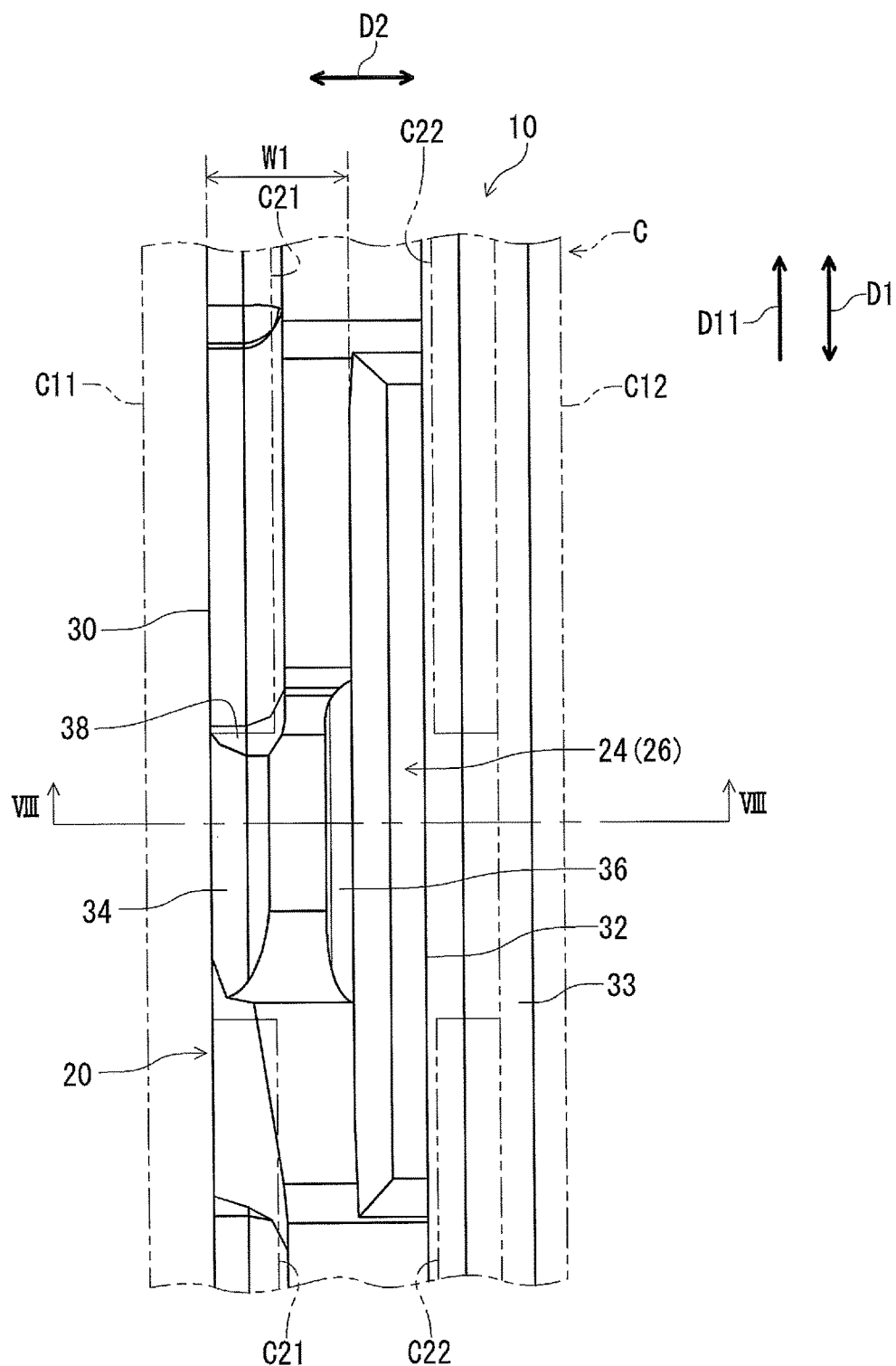
FIG. 5 is a partial plan view of a first tooth of the bicycle sprocket illustrated in FIG. 1 when viewed from the radial direction of the bicycle sprocket.

As seen in FIG. 5, the plurality of first teeth 26 each include an outer-link supporting surface 34 and an opposite surface 36. The outer-link supporting surface 34 is closer to the first side 30 than to the second side 32 in the axial direction D2. The outer-link supporting surface 34 is configured to support the first outer link plate C11 at the first side 30. The opposite surface 36 is opposite to the outer-link supporting surface 34 in the axial direction D2. The opposite surface 36 is spaced part from the second outer link plate C12 in a state where the chain engagement structure 22 engages with the bicycle chain C. In other words, the plurality of first teeth 26 each is free from another outer-link supporting surface opposite to the outer-link supporting surface 34 in the axial direction D2.

Figure 6:
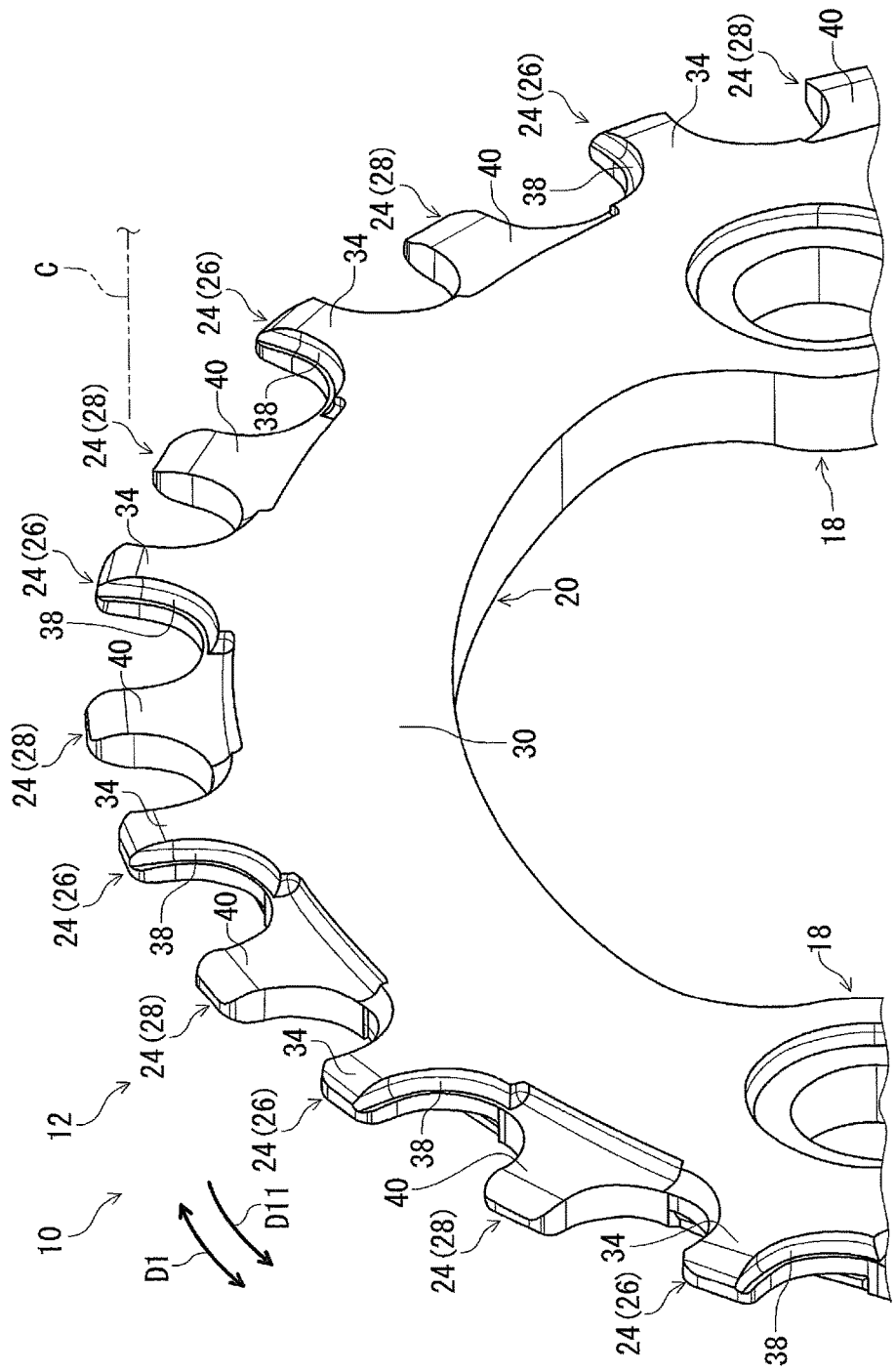
FIG. 6 is a perspective view of the bicycle sprocket illustrated in FIG. 1.

As seen in FIGS. 5 and 6, at least one of the plurality of first teeth 26 has a recess 38 to avoid an excessive contact of the at least one of the plurality of first teeth 26 with an inner link plate (e.g., the first inner link plate C21) of the bicycle chain C. In the illustrated embodiment, the plurality of first teeth 26 each have the recess 38 to avoid an excessive contact of the plurality of first teeth 26 with the inner link plate (e.g., the first inner link plate C21) of the bicycle chain C. The recess 38 is provided on the outer-link supporting surface 34. The recess 38 is closer to the first side 30 than the opposite surface 36.

Figure 7:
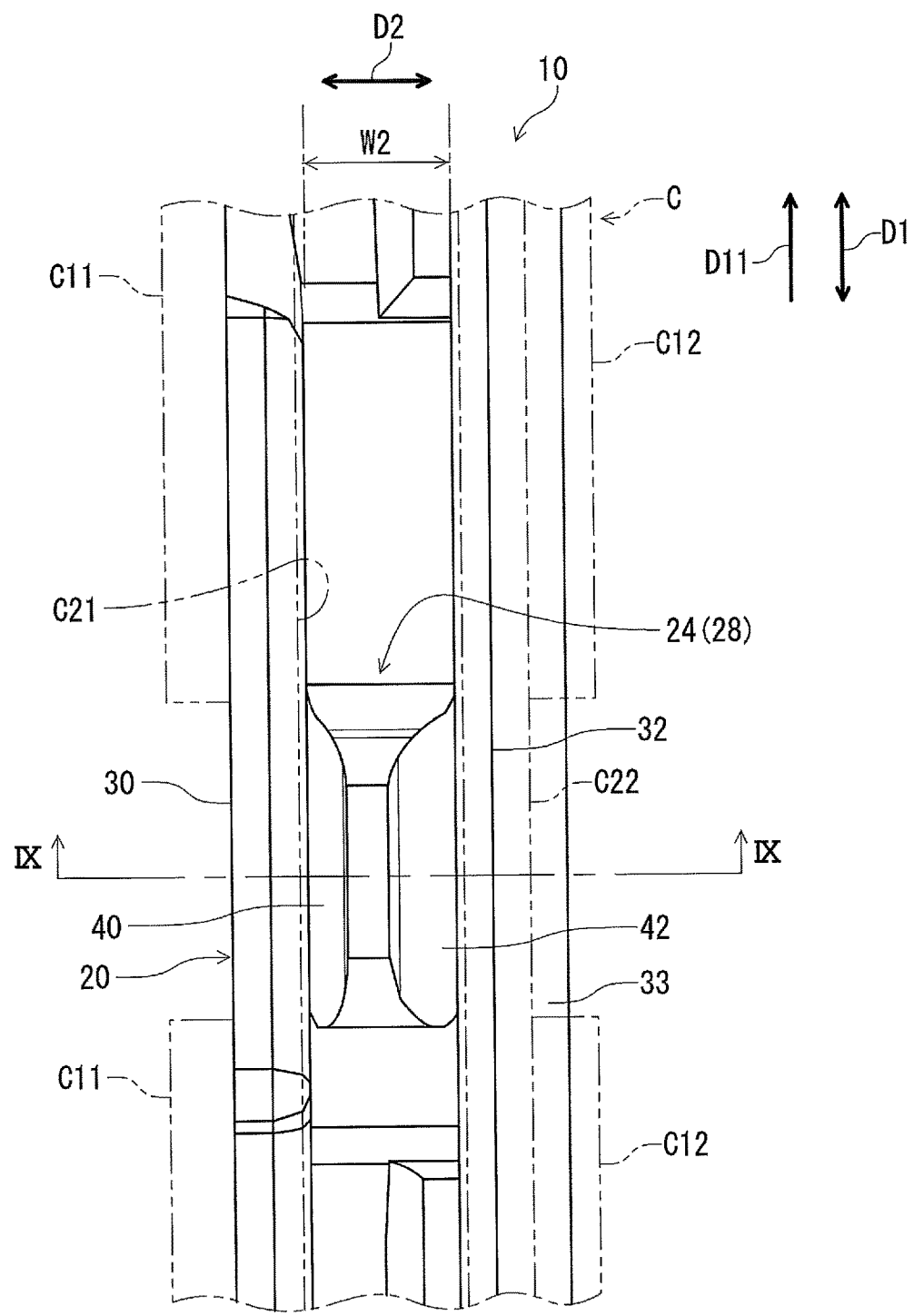
FIG. 7 is a partial plan view of a second tooth of the bicycle sprocket illustrated in FIG. 1 when viewed from the radial direction of the bicycle sprocket.

As seen in FIG. 7, the plurality of second teeth 28 each include a first inner-link supporting surface 40 and a second inner-link supporting surface 42. The first inner-link supporting surface 40 is closer to the first side 30 than to the second side 32 in the axial direction D2. The first inner-link supporting surface 40 is configured to support the first inner link plate C21. The second inner-link supporting surface 42 is closer to the second side 32 than to the first side 30 in the axial direction D2. The second inner-link supporting surface 42 is configured to support the second inner link plate C22. The second inner-link supporting surface 42 is opposite to the first inner-link supporting surface 40 in the axial direction D2.

As seen in FIGS. 5 and 7, the opposite surface 36 is closer to the first side 30 than the second inner-link supporting surface 42 in the axial direction D2. The plurality of first teeth 26 has a first axial chain-engagement width W1 (FIG. 5). The plurality of second teeth 28 has a second axial chain-engagement width W2 (FIG. 7) that is equal to or larger than the first axial chain-engagement width W1. In the illustrated embodiment, the second axial chain-engagement width W2 is equal to the first chain-engagement axial width W1. However, the second axial chain-engagement width W2 can be larger or smaller than the first chain-engagement axial width if needed and/or desired.

Figure 8:
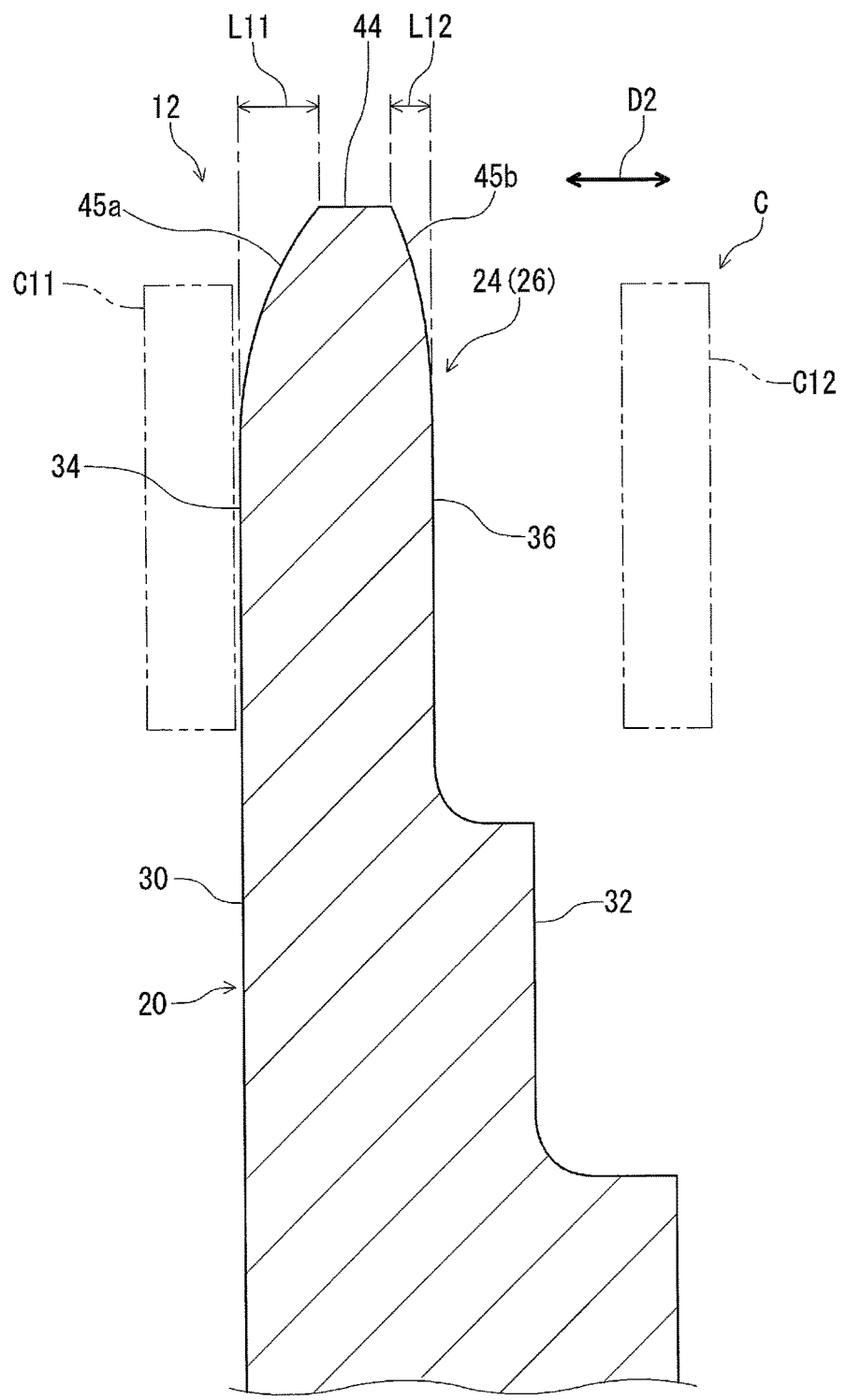
FIG. 8 is a partial cross-sectional view of the first tooth of the bicycle sprocket taken along line VIII-VIII of FIG. 5.

As seen in FIG. 8, the plurality of first teeth 26 each include a first radially outermost tooth-tip 44. The first radially outermost tooth-tip 44 is positioned between the outer-link supporting surface 34 and the opposite surface 36 in the axial direction D2. A maximum axial distance L11 between the first radially outermost tooth-tip 44 and the outer-link supporting surface 34 is longer than a maximum axial distance L12 between the first radially outermost tooth-tip 44 and the opposite surface 36 in the axial direction D2. Preferably, a first chamfered portion 45a is formed between the first radially outermost tooth-tip 44 and the outer-link supporting surface 34 for smooth engagement with the opposed pair of the first outer link plate C11 and the second outer link plated C12 of the bicycle chain C. Similarly, a second chamfered portion 45b is preferably formed between the first radially outermost tooth-tip 44 and the opposite surface 36 in the axial direction D2 for smooth engagement with the opposed pair of the first outer link plate C11 and the second outer link plated C12 of the bicycle chain C.

Figure 9:
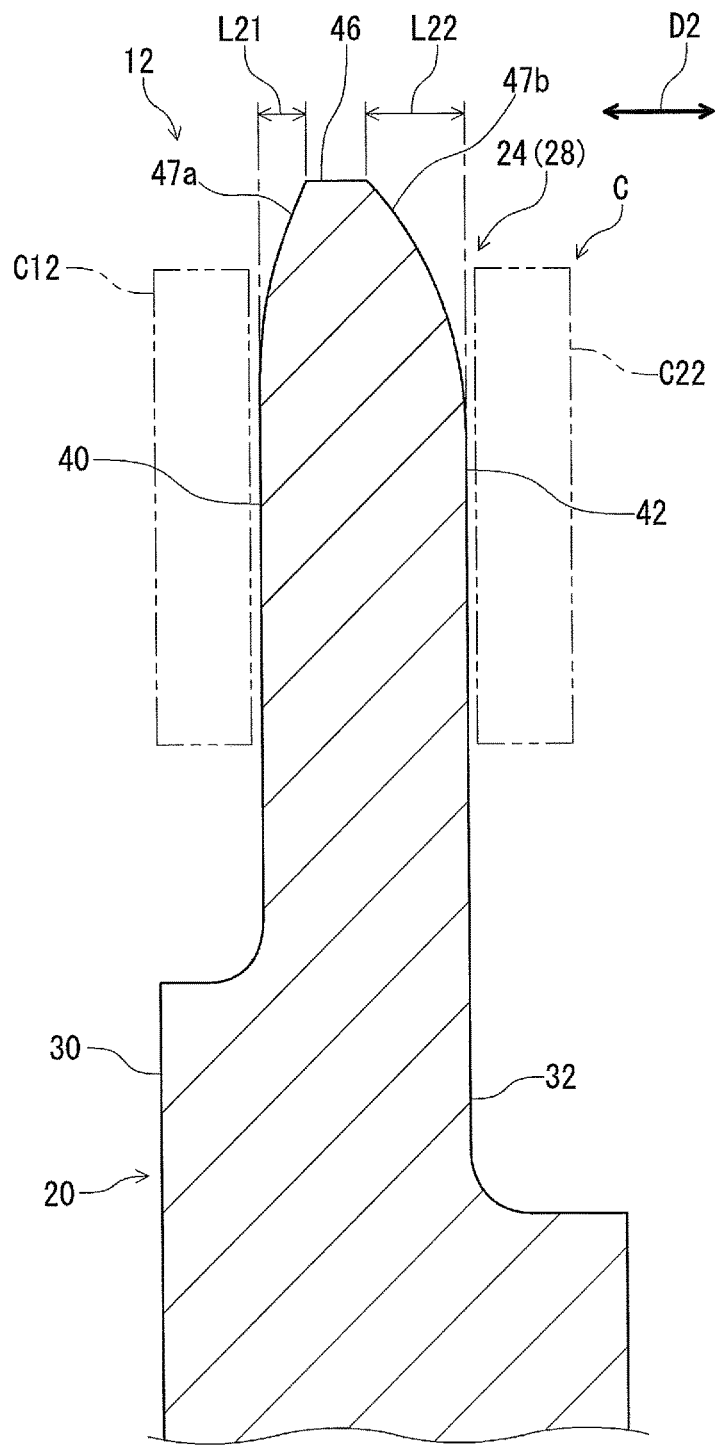
FIG. 9 is a partial cross-sectional view of the first tooth of the bicycle sprocket taken along line IX-IX of FIG. 7.

As seen in FIG. 9, the plurality of second teeth 28 each include a second radially outermost tooth-tip 46. The second radially outermost tooth-tip 46 is positioned between the first inner-link supporting surface 40 and the second inner-link supporting surface 42 in the axial direction D2. As seen in FIG. 3, the second radially outermost tooth-tip 46 is offset from the first radially outermost tooth-tip 44 of each of the plurality of first teeth 26 in the axial direction D2.

As seen in FIG. 9, a maximum axial distance L21 between the second radially outermost tooth-tip 46 and the first inner-link supporting surface 40 is shorter than a maximum axial distance L22 between the second radially outermost tooth-tip 46 and the second inner-link supporting surface 42 in the axial direction D2. Preferably, a third chamfered portion 47a is formed between the second radially outermost tooth-tip 46 and the first inner-link supporting surface 40 for smooth engagement with the opposed pair of the first inner link plate C21 and the second inner link plated C22 of the bicycle chain C. Similarly, a fourth chamfered portion 47b is preferably formed between the second radially outermost tooth-tip 46 and the second inner-link supporting surface 42 for smooth engagement with the opposed pair of the first inner link plate C21 and the second inner link plated C22 of the bicycle chain C.

The positional relationship between the bicycle sprocket 12 and the bicycle chain C will be described in detail referring to FIGS. 10 to 12.

Figure 10:
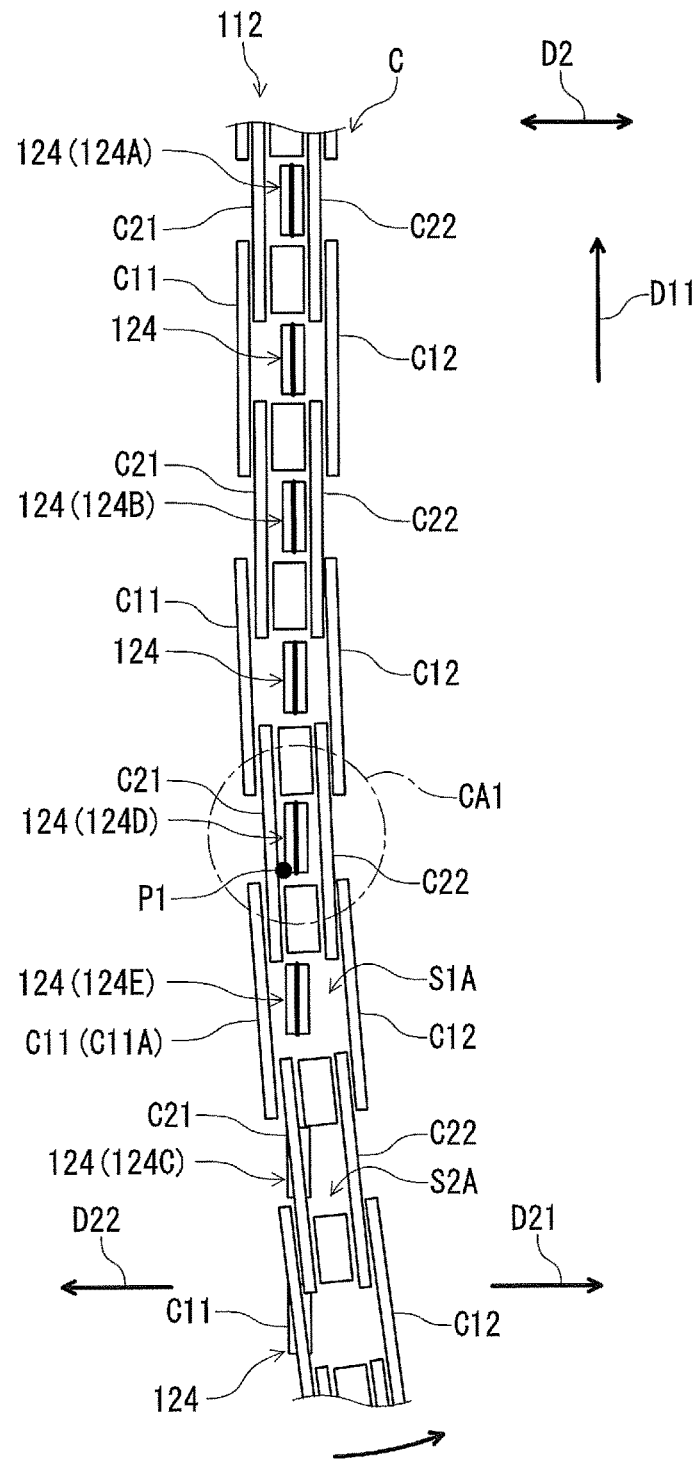
FIG. 10 is a schematic diagram showing a positional relationship between a bicycle chain and a comparative example of a bicycle sprocket.

FIG. 10 illustrates a bicycle sprocket 112 as a comparative example. The bicycle sprocket 112 includes a plurality of sprocket teeth 124. Unlike the bicycle sprocket 12, the plurality of sprocket teeth 124 are disposed at axial positions equal to each other in the bicycle sprocket 112.

As seen in FIG. 10, for example, when the bicycle chain C is shifted in a first axial direction D21, e.g. by a rear derailleur (not shown), the bicycle chain C pivots relative to the bicycle sprocket 112 about a fulcrum point P1. At this time, the sprocket teeth 124A and 124B respectively contact the second inner link plates C22 to stop the pivotal movement of the bicycle chain C. Thus, the sprocket tooth 124C is disposed relative to the bicycle chain C at a position at which the sprocket tooth 124C is prevented from engaging with the inner link space S2A in a chain engagement area CA1. In the chain engagement area CA1, one of the sprocket teeth 124 (e.g., the sprocket tooth 124D in FIG. 10) comes into engagement with the bicycle chain C during pedaling. Even when the sprocket tooth 124E comes into engagement with the outer link space S1A in the chain engagement area CA1, the sprocket tooth 124E does not move the bicycle chain C in a second axial direction D22 since a larger clearance is provided between the sprocket tooth 124E and the first outer link plate C11A. This causes the bicycle chain C to be unintentionally disengaged from the bicycle sprocket 112.

Figure 11:
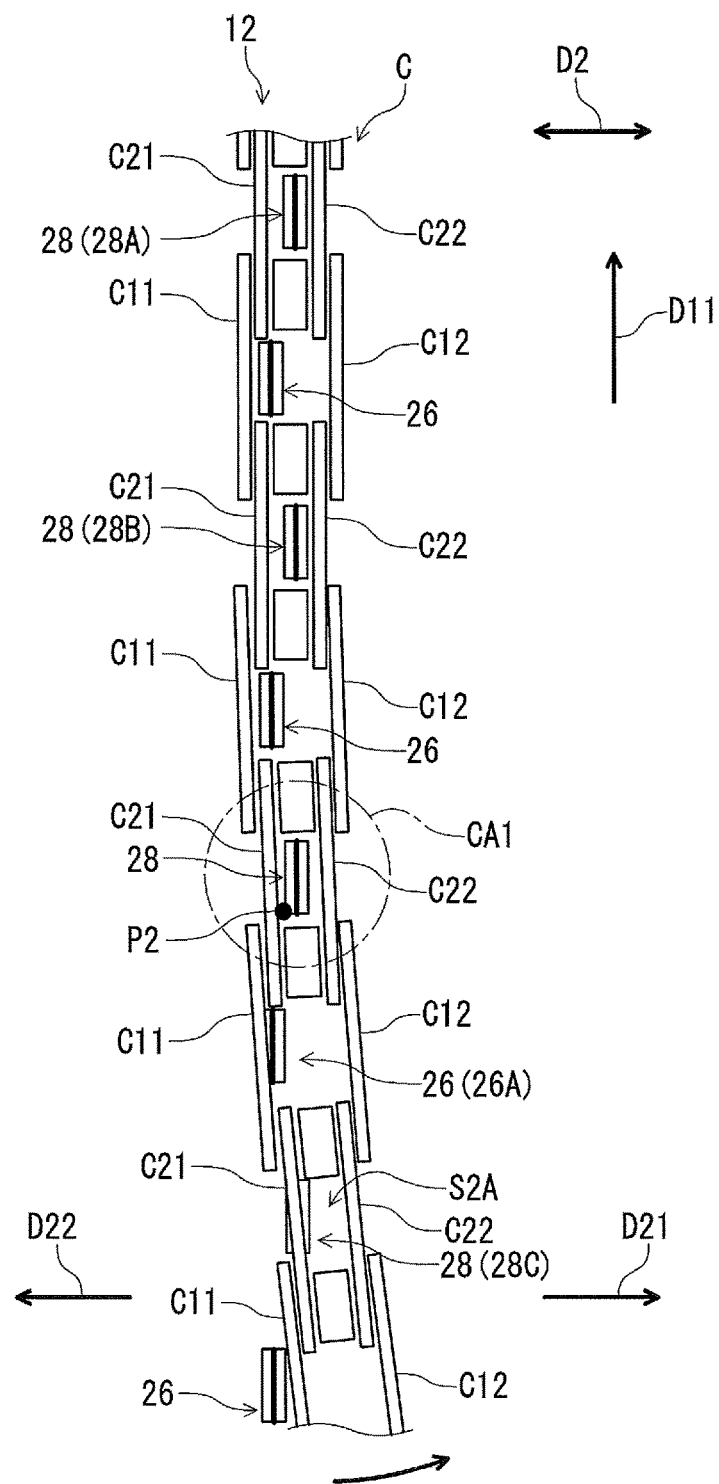
FIG. 11 is a schematic diagram showing a positional relationship between the bicycle chain and the bicycle sprocket illustrated in FIG. 1.

On the other hand, as seen in FIG. 11, when the bicycle chain C is shifted in the first axial direction D21, e.g. by the rear derailleur (not shown), the bicycle chain C pivots relative to the bicycle sprocket 12 about a fulcrum point P2. At this time, the second teeth 28A and 28B respectively contact the second inner link plates C22 to stop the pivotal movement of the bicycle chain C.

Figure 12:
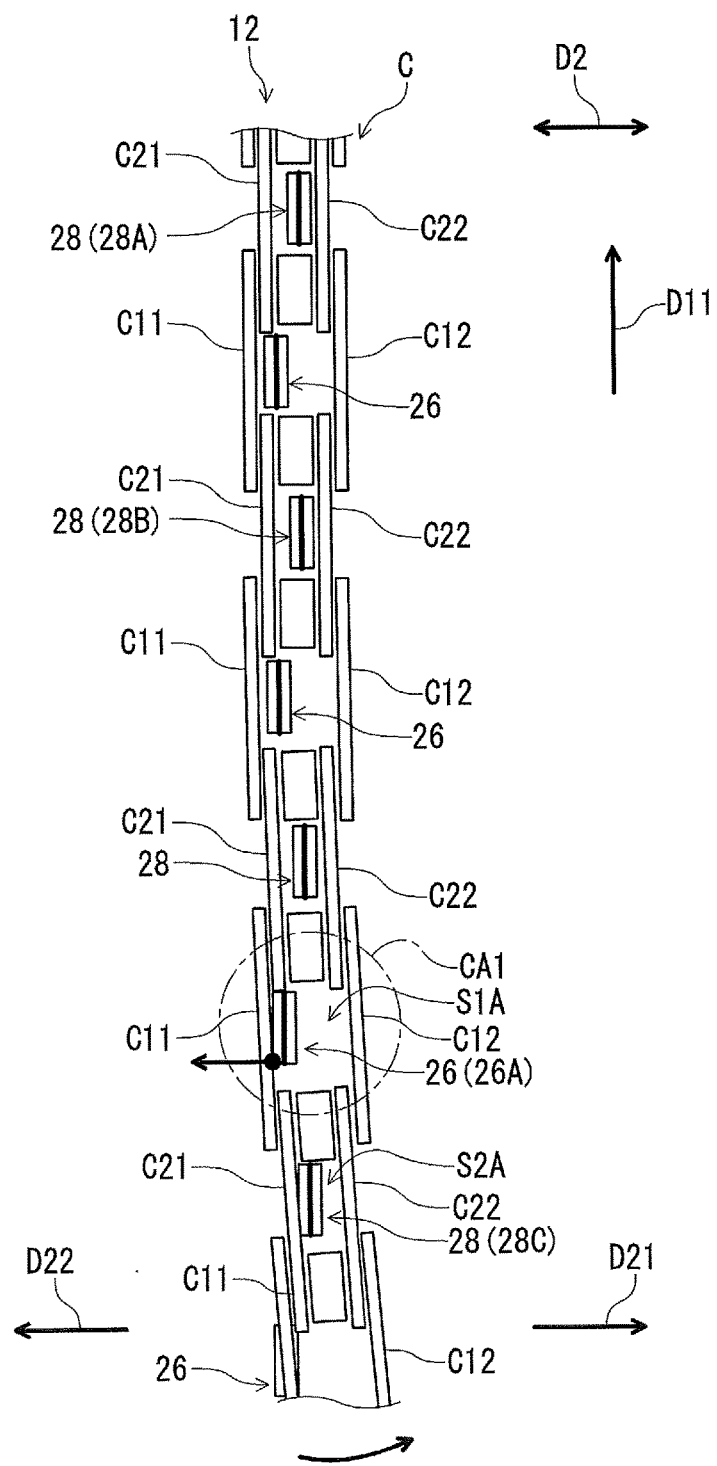
FIG. 12 is a schematic diagram showing a positional relationship between the bicycle chain and the bicycle sprocket illustrated in FIG. 1.

As seen in FIG. 12, however, the first tooth 26A moves the bicycle chain C in the second axial direction D2 in the chain engagement area CA1 since the first teeth 26 are offset toward the first side 30 in the second axial direction D2. This allows the second tooth 28C to engage with the inner link space S2A in the chain engagement area CA1, preventing the bicycle chain C from being unintentionally disengaged from the bicycle sprocket 12.

Figure 13:
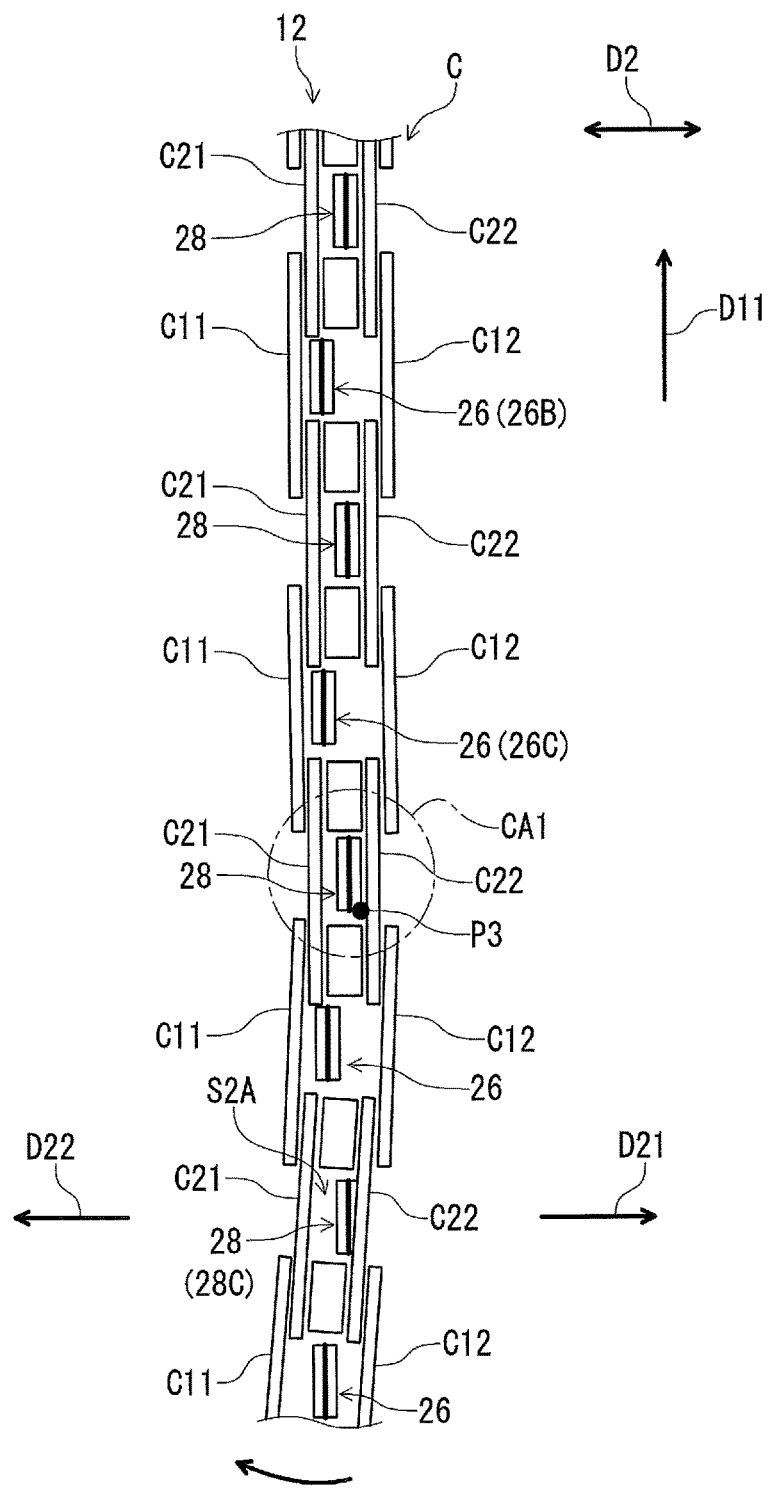
FIG. 13 is a schematic diagram showing a positional relationship between the bicycle chain and the bicycle sprocket illustrated in FIG. 1.

Furthermore, as seen in FIG. 13, when the bicycle chain C is shifted in the second axial direction D22, e.g. by the rear derailleur (not shown), the bicycle chain C pivots relative to the bicycle sprocket 12 about a fulcrum point P3. At this time, the first teeth 26B and 26C respectively contact the first outer link plates C11 to stop the pivotal movement of the bicycle chain C. This keeps the second tooth 28C relative to the bicycle chain C at a position at which the second tooth 28C is engageable with the inner link space S2A in the chain engagement area CA1. This allows the second tooth 28C to engage with the inner link space S2A in the chain engagement area CA1, preventing the bicycle chain C from being unintentionally disengaged from the bicycle sprocket 12.

According to the present invention, it is possible to obtain the following advantageous effects with the bicycle sprocket 12 and the bicycle crank assembly 10.

(1) The plurality of first teeth 26 each includes the outer-link supporting surface 34 and the opposite surface 36 opposite to the outer-link supporting surface 34 in the axial direction D2. The outer-link supporting surface 34 is closer to the first side 30 than to the second side 32 in the axial direction D2 and is configured to support the first outer link plate C11 at the first side 30. The opposite surface 36 is spaced part from the second outer link plate C12 in a state where the chain engagement structure 22 engages with the bicycle chain C. In other words, the plurality of first teeth 26 each are free from another outer-link supporting surface opposite to the outer-link supporting surface 34 in the axial direction D2. Accordingly, it is possible to improve the function to hold the bicycle chain C in the bicycle sprocket with reducing a frictional resistance between the plurality of first teeth 26 and the bicycle chain C.

(2) The plurality of first teeth 26 are each positioned to be closer to the first side 30 than the plurality of second teeth 28. Accordingly, it is possible to effectively improve the function to hold the bicycle chain C in the bicycle sprocket 12 with keeping a simple structure of the bicycle sprocket 12.

(3) The plurality of first teeth 26 has the first axial chain-engagement width W1. The plurality of second teeth 28 has the second axial chain-engagement width W2 that is equal to the first chain-engagement axial width. Accordingly, it is possible to improve the function to hold the bicycle chain C in the bicycle sprocket 12 with keeping the desired strength of the second teeth 28.

(4) The plurality of second teeth 28 are arranged alternatingly between the plurality of first teeth 26. Accordingly, it is possible to effectively improve the function to hold the bicycle chain C in the bicycle sprocket 12 because, during pedaling, the plurality of first teeth 26 can always engage with an opposed pair of the first outer link plate C11 and the second outer link plate C12 of the bicycle chain C and the plurality of second teeth 28 can always engage with the opposed pair of the first inner link plate C21 and the second inner link plate C22 of the bicycle chain C.

(5) The plurality of first teeth 26 are offset from the plurality of second teeth 28 toward the first side 30 in the axial direction D2. Accordingly, it is possible to effectively improve the function to hold the bicycle chain C in the bicycle sprocket 12.

(6) At least one of the plurality of first teeth 26 has the recess 38 to avoid an excessive contact of the at least one of the plurality of first teeth 26 with the inner link plate C21 of the bicycle chain C. Specifically, the plurality of first teeth 26 each have the recess 38 to avoid an excessive contact of the plurality of first teeth 26 with the inner link plate C21 of the bicycle chain C. Accordingly, it is possible to reduce a frictional resistance between the at least one of the plurality of first teeth 26 and the inner link plate C21 of the bicycle chain C.

Second Embodiment

A bicycle crank assembly 210 comprising a bicycle sprocket 212 in accordance with a second embodiment will be described below referring to FIG. 14. The bicycle crank assembly 210 has the same configuration as the bicycle crank assembly 10 except for the arrangement of the first side 30 and the second side 32. Thus, elements having substantially the same function as those in the first embodiment will be numbered the same here, and will not be described and/or illustrated again in detail here for the sake of brevity.

Figure 14:
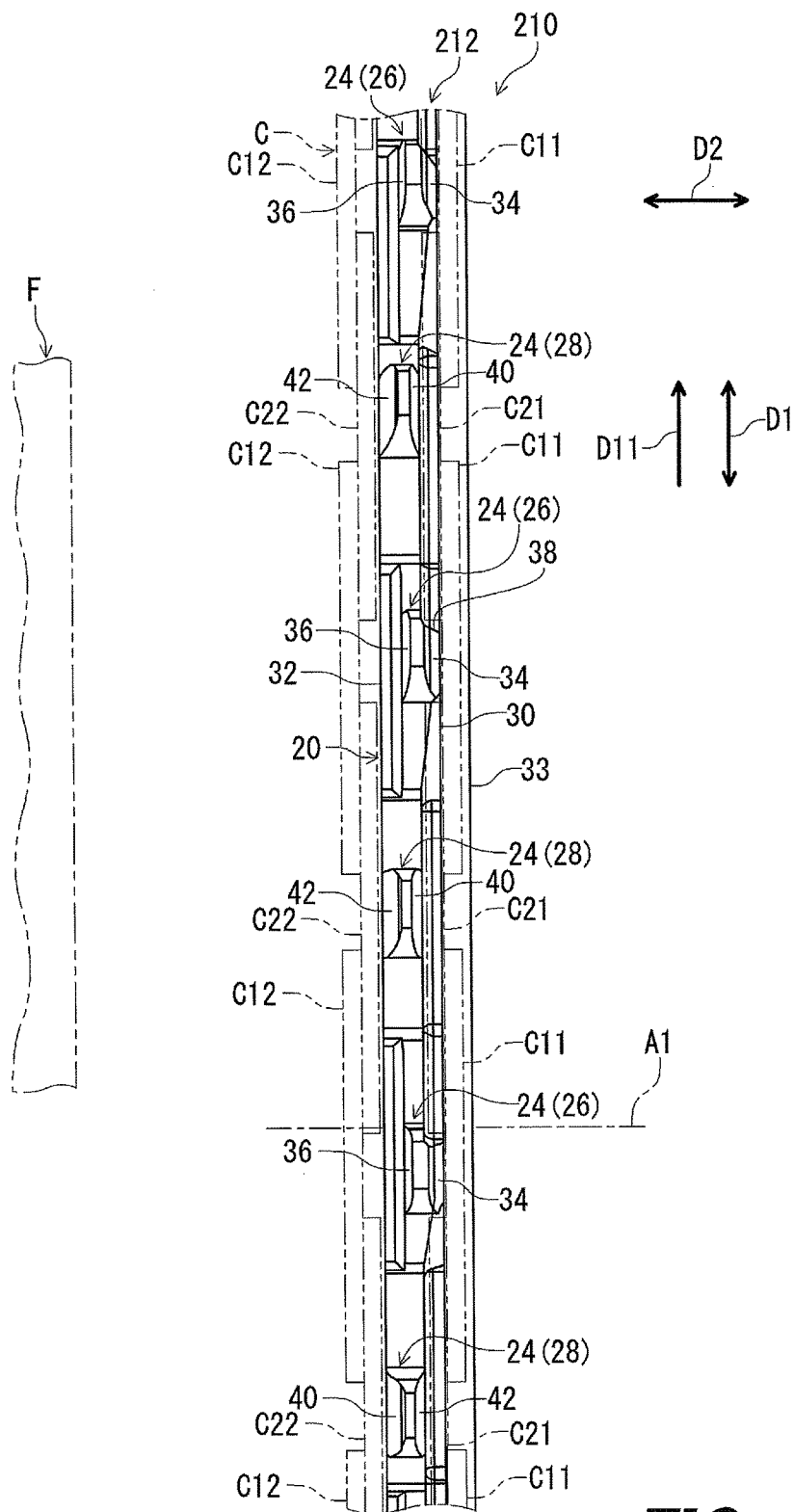
FIG. 14 is a partial plan view of a bicycle sprocket in accordance with a second embodiment.

As seen in FIG. 14, in the bicycle sprocket 212, the second side 32 is closer to the bicycle frame F than the first side 30 in the axial direction D2 in a state where the bicycle sprocket 212 is mounted to the bicycle frame F. The first teeth 26 and the second teeth 28 are reversed in the axial direction D2. In the illustrated embodiment, the annular part 33 is provided on the first side 30.

With the bicycle sprocket 212, it is possible to obtain substantially the same advantageous effects as those of the bicycle sprocket 12 in accordance with the first embodiment.

Third Embodiment

A bicycle crank assembly 310 comprising a bicycle sprocket 312 in accordance with a third embodiment will be described below referring to FIG. 15. The bicycle crank assembly 310 has the same configuration as the bicycle crank assembly 10 except for the sprocket teeth 24. Thus, elements having substantially the same function as those in the above embodiments will be numbered the same here, and will not be described and/or illustrated again in detail here for the sake of brevity.

Figure 15:
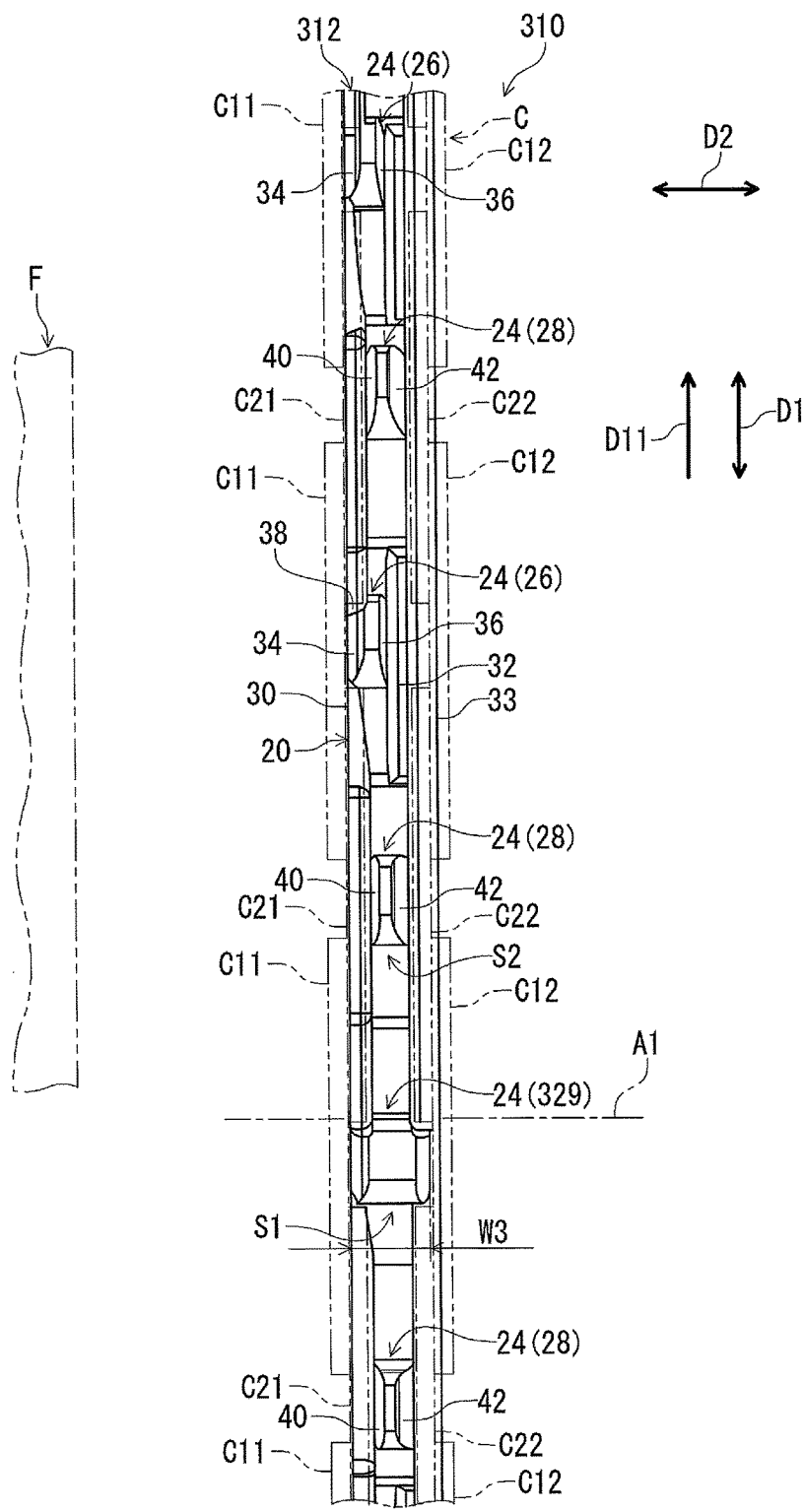
FIG. 15 is a partial plan view of a bicycle sprocket in accordance with a third embodiment.

As seen in FIG. 15, in the bicycle sprocket 312, the plurality of sprocket teeth 24 includes at least one third tooth configured to engage with a pair of outer link plates C11 and C12 of the bicycle chain C. The at least one third tooth has a chain-engagement width. In the illustrated embodiment, the plurality of sprocket teeth 24 includes a third tooth 329 configured to engage with a pair of outer link plates C11 and C12 of the bicycle chain C. The third tooth 329 has a chain-engagement width W3. The chain-engagement width W3 is larger than an inner link space S2 defined between a pair of inner link plates C21 and C22 of the bicycle chain C and smaller than or equal to an outer link space S1 defined between a pair of outer link plates C11 and C12 of the bicycle chain C. In the illustrated embodiment, a total number of the plurality of first teeth 26 is less than a total number of the plurality of second teeth 28 since one of the first teeth 26 is replaced with the third tooth 329.

With the bicycle sprocket 312, it is possible to obtain substantially the same advantageous effects as those of the bicycle sprocket 12 in accordance with the first embodiment.

Furthermore, it is possible to prevent the bicycle chain C from being engaged with the bicycle sprocket 312 in a wrong arrangement since the plurality of sprocket teeth 24 includes the third tooth 329 that is configured to engage with a pair of outer link plates C11 and C12 of the bicycle chain C only. A separate cap having substantially the same shape and/or the same chain-engagement width as that of the third tooth 329 can be attached to at least one of the first teeth 26 if needed and/or desired.

Fourth Embodiment

A bicycle crank assembly 410 comprising a bicycle sprocket 412 in accordance with a fourth embodiment will be described below referring to FIG. 16. The bicycle crank assembly 410 has the same configuration as the bicycle crank assembly 10 except for the first teeth 26. Thus, elements having substantially the same function as those in the above embodiments will be numbered the same here, and will not be described and/or illustrated again in detail here for the sake of brevity.

Figure 16:
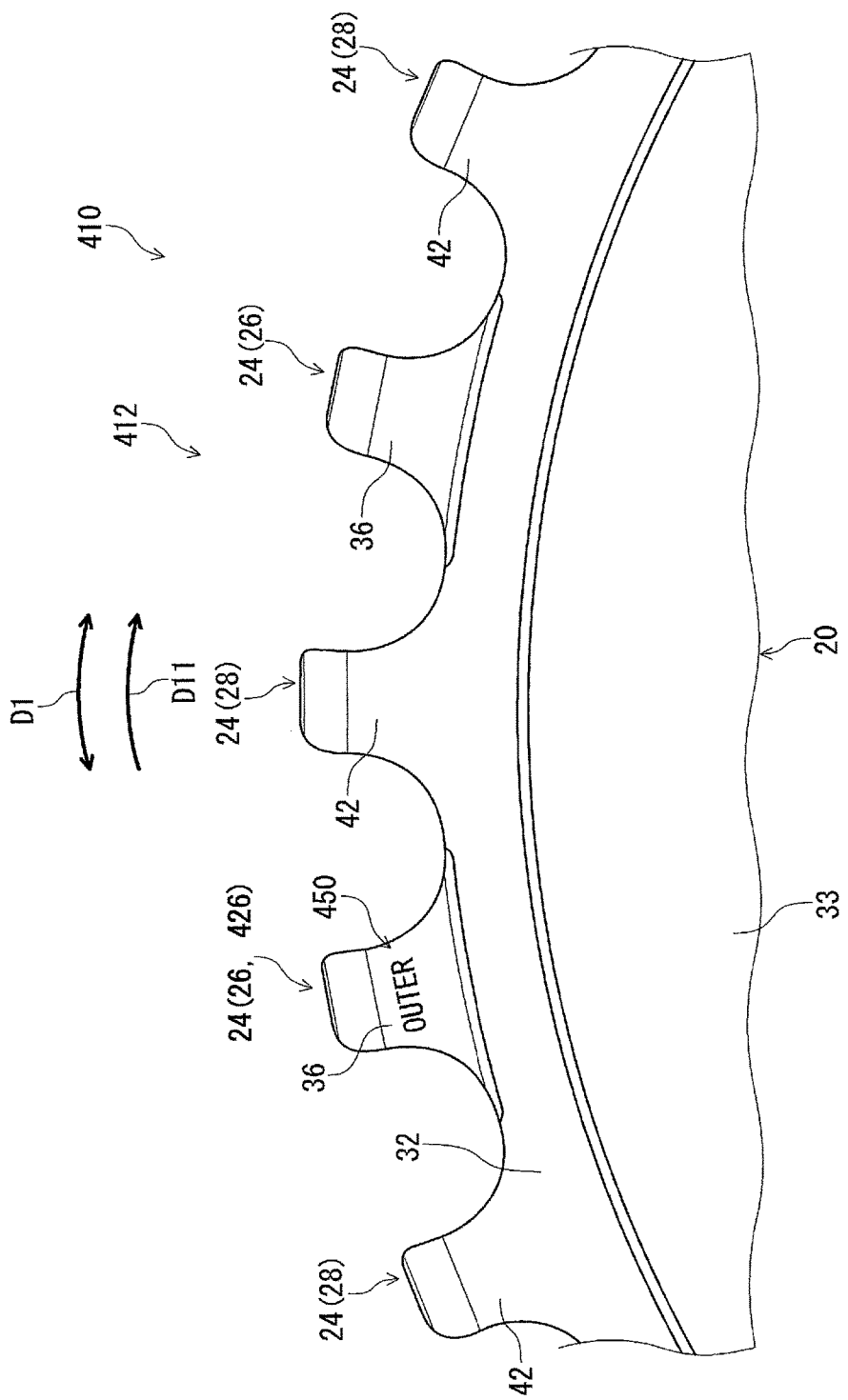
FIG. 16 is a partial elevational view of a bicycle sprocket in accordance with a fourth embodiment.

As seen in FIG. 16, in the bicycle sprocket 412, at least one of the plurality of first teeth 26 has an indicator to indicate that the at least one of the plurality of first teeth 26 engages with outer link plates C11 and C12 of the bicycle chain C. In the illustrated embodiment, the plurality of first teeth 26 include a first tooth 426 having substantially the same structure as that of other first teeth 26. However, the first tooth 426 has an indicator 450 to indicate that the first tooth 426 engages with the outer link plates C11 and C12 of the bicycle chain C. The indicator 450 includes, for example, a mark "OUTER" provided on the opposite surface 36. The indicator 450 is formed by press working, printing, metal finishing such as alumite treatment, for example. Alternatively, at least one of the plurality of second teeth 28 may have an indicator to indicate that the at least one of the plurality of second teeth 28 engages with inner link plates C21 and C22 of the bicycle chain C. Further, both of at least one of first teeth 26 and at least one of second teeth 28 may each have an indicator to indicate that the at least one of the plurality of first teeth 26 engages with outer link plates C11 and C12 of the bicycle chain C and the at least one of the plurality of second teeth 28 engages with inner link plates C21 and C22 of the bicycle chain C.

With the bicycle sprocket 412, it is possible to obtain substantially the same advantageous effects as those of the bicycle sprocket 12 in accordance with the first embodiment.

Furthermore, it is possible to prevent the bicycle chain C from being engaged with the bicycle sprocket 412 in a wrong arrangement since the first tooth 426 has the indicator 450.

Fifth Embodiment

A bicycle crank assembly 510 comprising a bicycle sprocket 512 in accordance with a fifth embodiment will be described below referring to FIGS. 17 to 19. The bicycle crank assembly 510 has the same configuration as the bicycle crank assembly 10 except for the arrangement of the first teeth 26. Thus, elements having substantially the same function as those in the above embodiments will be numbered the same here, and will not be described and/or illustrated again in detail here for the sake of brevity.

Figure 17:
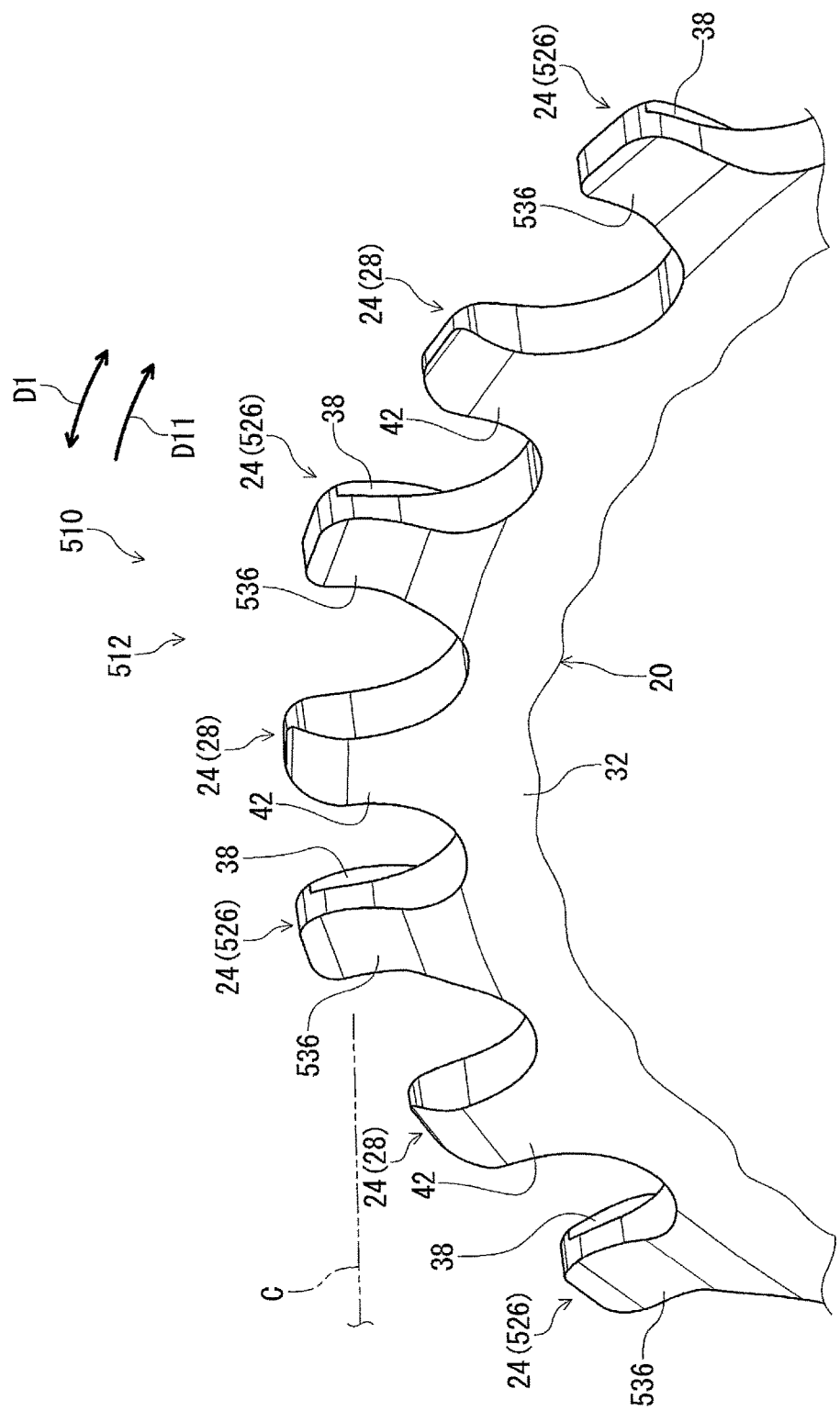
FIG. 17 is a partial perspective view of a bicycle sprocket in accordance with a fifth embodiment.
Figure 18:
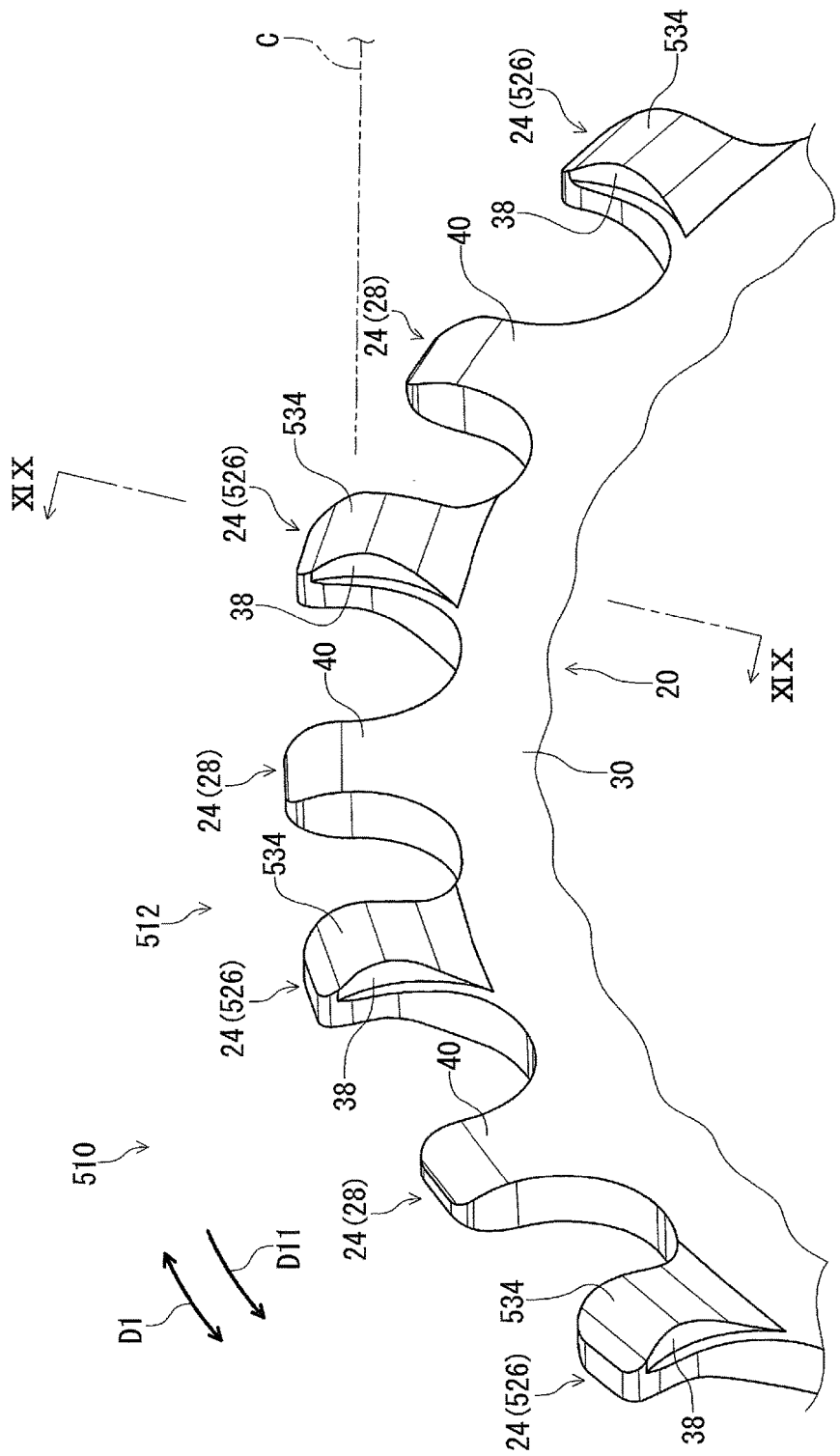
FIG. 18 is a partial perspective view of the bicycle sprocket illustrated in FIG. 17.
Figure 19:
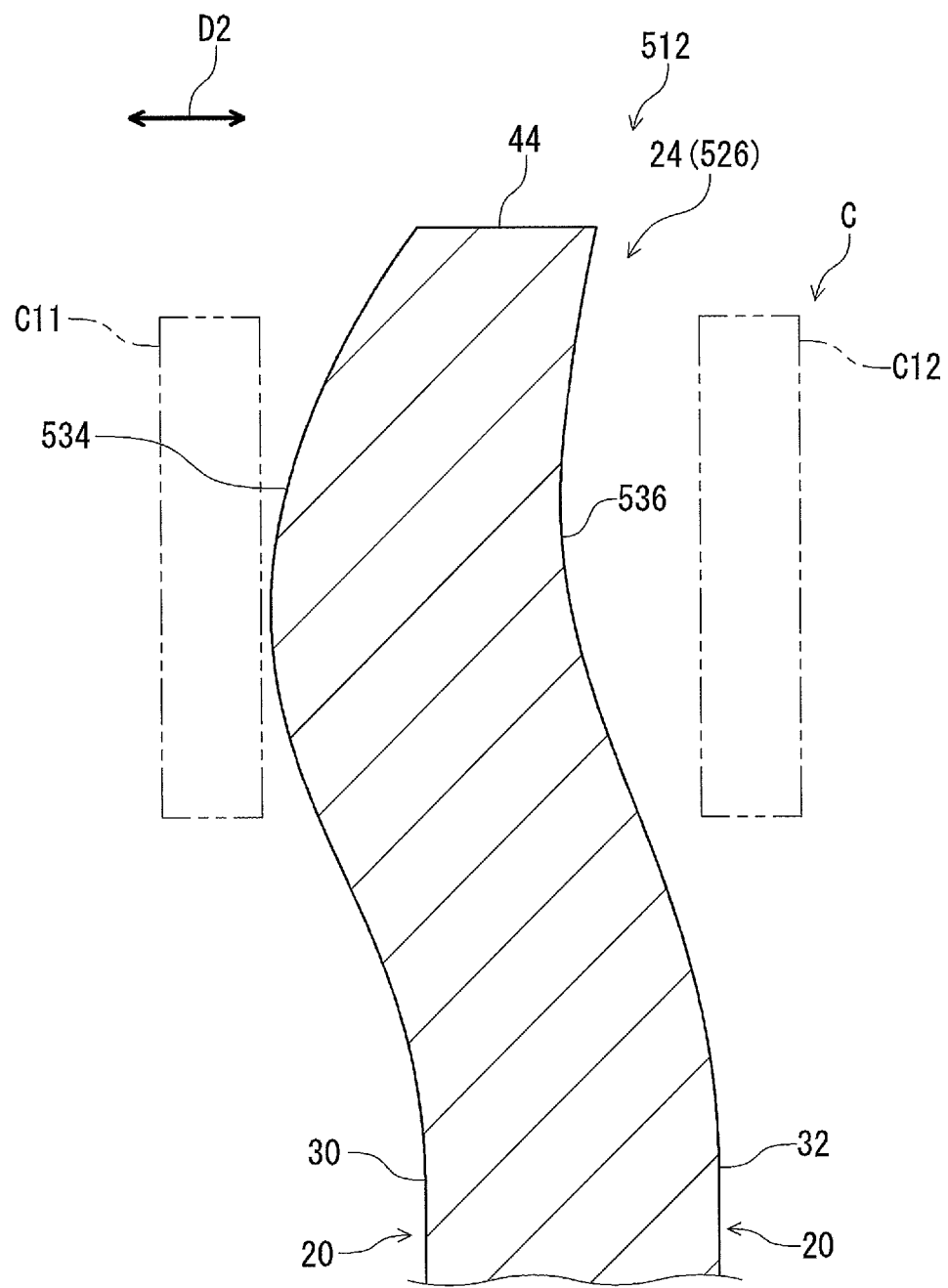
FIG. 19 is a partial cross-sectional view of a first tooth of the bicycle sprocket taken along line XIX-XIX of FIG. 18.

As seen in FIGS. 17 to 19, in the bicycle sprocket 512, the plurality of sprocket teeth 24 include a plurality of first teeth 526. The plurality of first teeth 526 each include an outer-link supporting surface 534 and an opposite surface 536. The outer-link supporting surface 534 is closer to the first side 30 than to the second side 32 in the axial direction D2. The plurality of first teeth 526 are configured to support the first outer link plate C11 at the first side 30. The opposite surface 536 is opposite to the outer-link supporting surface 534 in the axial direction D2. The opposite surface 536 is spaced part from the second outer link plate C12 in a state where the chain engagement structure 22 engages with the bicycle chain C.

The plurality of first teeth 526 have substantially the same structure as that of the plurality of first teeth 26 in the first embodiment. However, the outer-link supporting surface 534 is formed by bending the plurality of first teeth 26. The outer-link supporting surface 534 has a curved shape. The opposite surface 536 has a curved shape. Specifically, the outer-link supporting surface 534 has a convex shape. The opposite surface 536 has a concave shape.

With the bicycle sprocket 512, it is possible to obtain substantially the same advantageous effects as those of the bicycle sprocket 12 in accordance with the first embodiment.

Furthermore, it is possible to effectively improve the function to hold the bicycle chain C in the bicycle sprocket 512 with keeping a simple structure of the bicycle sprocket 512 since the outer-link supporting surface 34 is formed by bending the plurality of first teeth 26.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
a sprocket body having a rotational center axis, a first side and a second side opposite to the first side in an axial direction parallel to the rotational center axis; and
a chain engagement structure disposed on an outer periphery of the sprocket body, the chain engagement structure including a plurality of sprocket teeth extending radially outward from the outer periphery of the sprocket body, the plurality of sprocket teeth including a plurality of first teeth and a plurality of second teeth, the plurality of first teeth being configured to engage with an opposed pair of a first outer link plate and a second outer link plate of a bicycle chain, the plurality of second teeth being configured to engage with an opposed pair of a first inner link plate and a second inner link plate of the bicycle chain, the plurality of first teeth each including
an outer-link supporting surface closer to the first side than to the second side in the axial direction and configured to support the first outer link plate at the first side,
an opposite surface opposite to the outer-link supporting surface in the axial direction, the opposite surface being spaced part from the second outer link plate in a state where the chain engagement structure engages with the bicycle chain, and
a first radially outermost tooth-tip positioned between the outer-link supporting surface and the opposite surface in the axial direction,
the plurality of second teeth each including
a second radially outermost tooth-tip that is offset from the first radially outermost tooth-tip of each of the plurality of first teeth in the axial direction, and
a first inner-link supporting surface closer to the first side than to the second side in the axial direction and configured to support the first inner link plate, and
at least one of the plurality of second teeth being disposed between two of the plurality of first teeth so that the at least one of the plurality of second teeth is adjacent to each of the two of the plurality of first teeth without another tooth between the at least one of the plurality of second teeth and each of the two of the plurality of first teeth.

2. The bicycle sprocket according to claim 1, wherein the plurality of first teeth are each positioned to be closer to the first side than the plurality of second teeth.

3. The bicycle sprocket according to claim 1, wherein the plurality of first teeth has a first axial chain-engagement width, and
the plurality of second teeth has a second axial chain-engagement width that is equal to or larger than the first axial chain-engagement width.

4. The bicycle sprocket according to claim 1, wherein a total number of the plurality of sprocket teeth is an even number.

5. The bicycle sprocket according to claim 4, wherein a total number of the plurality of first teeth is equal to a total number of the plurality of second teeth.

6. The bicycle sprocket according to claim 1, wherein the plurality of second teeth are arranged alternatingly between the plurality of first teeth.

7. The bicycle sprocket according to claim 1, wherein the plurality of sprocket teeth includes at least one third tooth configured to engage with a pair of outer link plates of a bicycle chain, the at least one third tooth having a chain-engagement width that is larger than an inner link space defined between a pair of inner link plates of the bicycle chain and smaller than an outer link space defined between a pair of outer link plates of the bicycle chain.

8. The bicycle sprocket according to claim 7, wherein a total number of the plurality of first teeth is less than a total number of the plurality of second teeth.

9. The bicycle sprocket according to claim 1, wherein at least one of the plurality of first teeth has an indicator to indicate that the at least one of the plurality of first teeth engages with outer link plates of the bicycle chain.

10. The bicycle sprocket according to claim 1, wherein the plurality of first teeth are offset from the plurality of second teeth toward the first side in the axial direction.

11. The bicycle sprocket according to claim 1, wherein at least one of the plurality of first teeth has a recess to avoid an excessive contact of the at least one of the plurality of first teeth with an inner link plate of the bicycle chain.

12. The bicycle sprocket according to claim 1, wherein the plurality of first teeth each have a recess to avoid an excessive contact of the plurality of first teeth with an inner link plate of the bicycle chain.

13. The bicycle sprocket according to claim 1, wherein the outer-link supporting surface is formed by bending the plurality of first teeth.

14. The bicycle sprocket according to claim 1, wherein the first side is closer to a bicycle frame than the second side in the axial direction in a state where the bicycle sprocket is mounted to the bicycle frame.

15. The bicycle sprocket according to claim 1, wherein the second side is closer to a bicycle frame than the first side in the axial direction in a state where the bicycle sprocket is mounted to the bicycle frame.

16. The bicycle sprocket according to claim 1, further comprising:
a crank arm attachment portion.

17. A bicycle crank assembly comprising:
the bicycle sprocket according to claim 1.

18. The bicycle crank assembly according to claim 17, wherein
the bicycle sprocket is a single sprocket for the bicycle crank assembly.

19. A bicycle sprocket comprising:
a sprocket body having a rotational center axis, a first side and a second side opposite to the first side in an axial direction parallel to the rotational center axis; and
a chain engagement structure disposed on an outer periphery of the sprocket body, the chain engagement structure including a plurality of sprocket teeth extending radially outward from the outer periphery of the sprocket body, the plurality of sprocket teeth including a plurality of first teeth and a plurality of second teeth, the plurality of first teeth being configured to engage with an opposed pair of a first outer link plate and a second outer link plate of a bicycle chain, the plurality of second teeth being configured to engage with an opposed pair of a first inner link plate and a second inner link plate of the bicycle chain, the plurality of first teeth each including
an outer-link supporting surface closer to the first side than to the second side in the axial direction and configured to support the first outer link plate at the first side,
an opposite surface opposite to the outer-link supporting surface in the axial direction, the opposite surface being spaced part from the second outer link plate in a state where the chain engagement structure engages with the bicycle chain, and
a first radially outermost tooth-tip positioned between the outer-link supporting surface and the opposite surface in the axial direction,
the plurality of second teeth each including a second radially outermost tooth-tip that is offset from the first radially outermost tooth-tip of each of the plurality of first teeth in the axial direction,
at least one of the plurality of second teeth being disposed between two of the plurality of first teeth so that the at least one of the plurality of second teeth is adjacent to each of the two of the plurality of first teeth without another tooth between the at least one of the plurality of second teeth and each of the two of the plurality of first teeth,
the plurality of second teeth each including
a first inner-link supporting surface closer to the first side than to the second side in the axial direction and configured to support the first inner link plate, and
a second inner-link supporting surface closer to the second side than to the first side in the axial direction and configured to support the second inner link plate, the second inner-link supporting surface being opposite to the first inner-link supporting surface in the axial direction, and
the second radially outermost tooth-tip being positioned between the first inner-link supporting surface and the second inner-link supporting surface in the axial direction, a maximum axial distance between the second radially outermost tooth-tip and the first inner-link supporting surface being shorter than a maximum axial distance between the second radially outermost tooth-tip and the second inner-link supporting surface in the axial direction.

20. The bicycle sprocket according to claim 1, wherein the plurality of second teeth each include
a second inner-link supporting surface closer to the second side than to the first side in the axial direction and configured to support the second inner link plate, the second inner-link supporting surface being opposite to the first inner-link supporting surface in the axial direction, and
the opposite surface of the plurality of first teeth is closer to the first side than the second inner-link supporting surface in the axial direction.

21. A bicycle sprocket comprising:
a sprocket body having a rotational center axis, a first side and a second side opposite to the first side in an axial direction parallel to the rotational center axis; and
a chain engagement structure disposed on an outer periphery of the sprocket body, the chain engagement structure including a plurality of sprocket teeth extending radially outward from the outer periphery of the sprocket body, the plurality of sprocket teeth including a plurality of first teeth and a plurality of second teeth, the plurality of first teeth being configured to engage with an opposed pair of a first outer link plate and a second outer link plate of a bicycle chain, the plurality of second teeth being configured to engage with an opposed pair of a first inner link plate and a second inner link plate of the bicycle chain, the plurality of first teeth each including a first radially outermost tooth-tip and an outer-link supporting surface closer to the first side than to the second side in the axial direction, the outer-link supporting surface being configured to support the first outer link plate at the first side, the plurality of first teeth each being free from another outer-link supporting surface opposite to the outer-link supporting surface in the axial direction, the plurality of second teeth each including
- a second radially outermost tooth-tip that is offset from the first radially outermost tooth-tip of each of the plurality of first teeth in the axial direction, and
- a first inner-link supporting surface closer to the first side than to the second side in the axial direction and configured to support the first inner link plate, and at least one of the plurality of second teeth being disposed between two of the plurality of first teeth so that the at least one of the plurality of second teeth is adjacent to each of the two of the plurality of first teeth without another tooth between the at least one of the plurality of second teeth and each of the two of the plurality of first teeth.

22. The bicycle sprocket according to claim 21, wherein the plurality of second teeth each include a second inner-link supporting surface closer to the second side than to the first side in the axial direction and configured to support the second inner link plate, the second inner-link supporting surface being opposite to the first inner-link supporting surface in the axial direction.

23. The bicycle sprocket according to claim 1, wherein the plurality of second teeth each include a second inner-link supporting surface closer to the second side than to the first side in the axial direction and configured to support the second inner link plate, the second inner-link supporting surface being opposite to the first inner-link supporting surface in the axial direction.

* * * * *